United States Patent [19]

Kawakami

[11] Patent Number: 5,049,791

[45] Date of Patent: Sep. 17, 1991

[54] DEVICE FOR MEASURING A CHARACTERISTIC OF A COLOR CATHODE RAY TUBE

[75] Inventor: Yuichi Kawakami, Osaka, Japan

[73] Assignee: Minolta Camera Kabushiki Kaisha, Osaka, Japan

[21] Appl. No.: 455,628

[22] Filed: Dec. 22, 1989

[30] Foreign Application Priority Data

Dec. 27, 1988 [JP] Japan .................................. 63-330931

[51] Int. Cl.[5] .......................... G09G 1/28; H01J 29/51; H04N 17/02
[52] U.S. Cl. .................................. 315/368 R; 358/10; 358/139
[58] Field of Search .................... 315/368; 358/10, 139

[56] References Cited

U.S. PATENT DOCUMENTS 4,593,309  6/1986  Uno et al. ............................. 315/368
4,686,429  8/1987  Fendley ................................ 315/368

*Primary Examiner*—Gregory C. Issing
*Attorney, Agent, or Firm*—Joseph W. Price

[57] ABSTRACT

A device for measuring convergence of a color CRT including image pickup means for producing three color image signals with respect to three color test patterns constituting a composite test pattern presented on a viewing screen of a color CRT, change means for changing the image magnification of said image pickup means according to the pitch between color phosphor elements on the viewing screen, and calculation means for calculating respective luminous centers of gravity of the three color test patterns from the three color image signals, and calculating a misconvergence of the color CRT from the calculated luminous centers of gravity and a changed image magnification.

13 Claims, 23 Drawing Sheets

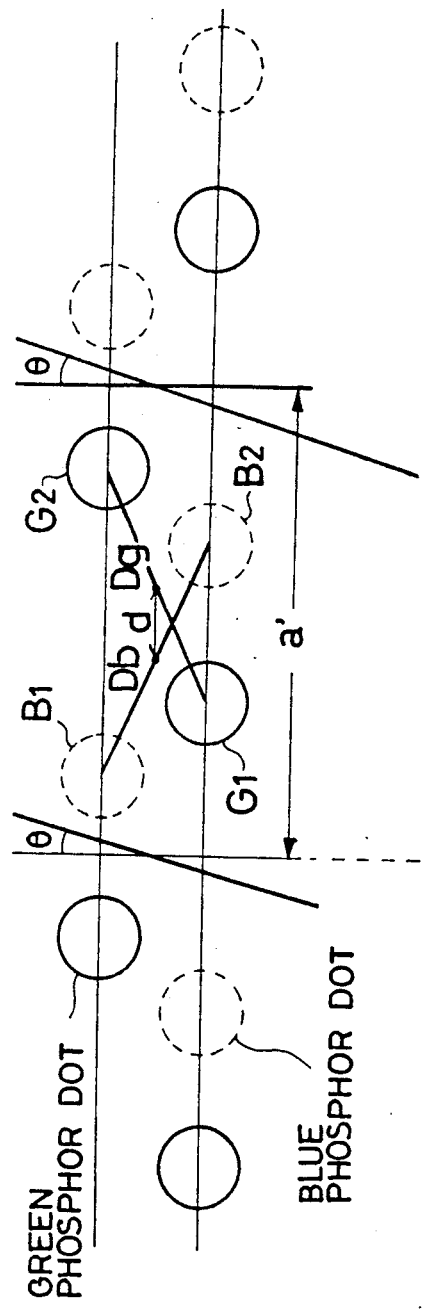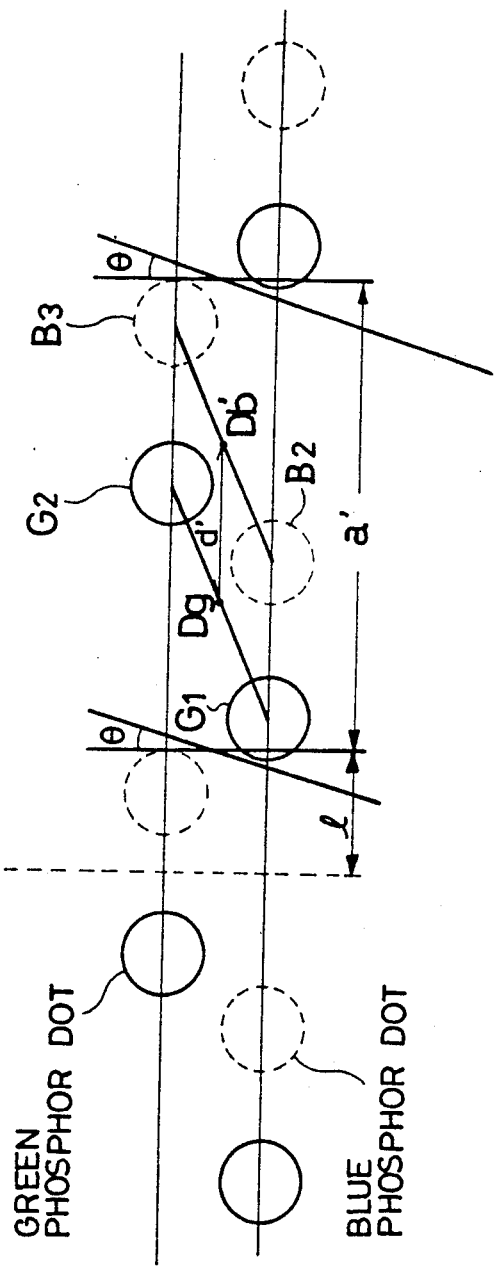
FIG. 5A
FIG. 5B

FIG. 6A
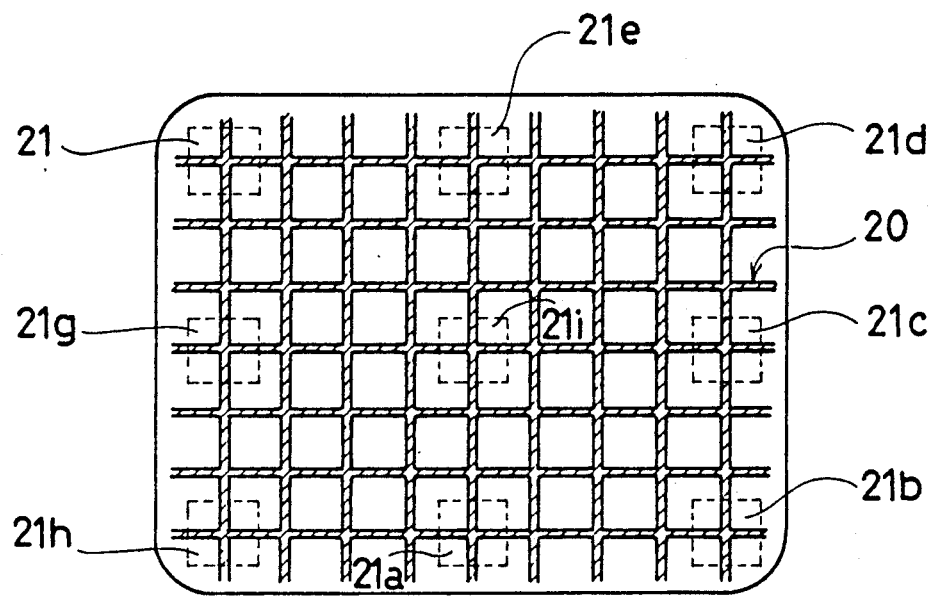
FIG. 6B
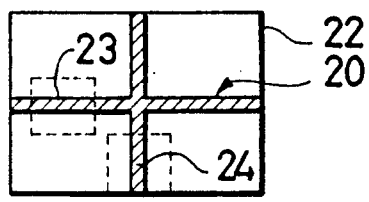
FIG. 6C
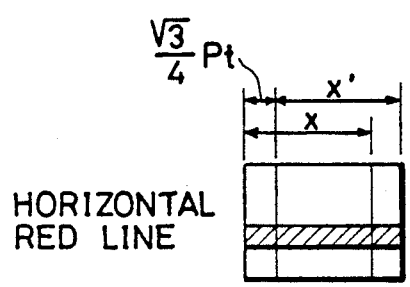
FIG. 6D
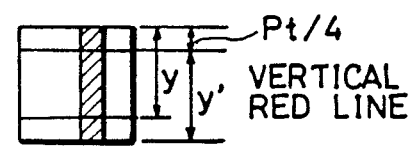
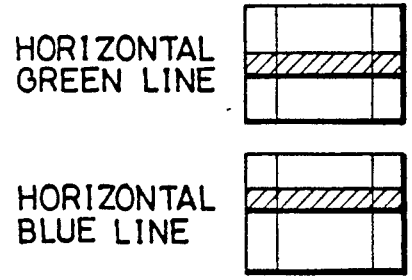
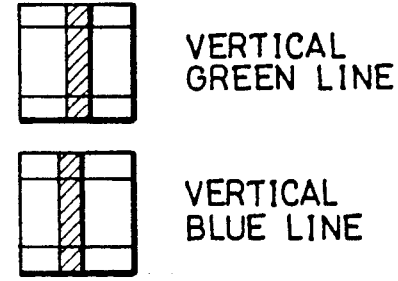

FIG.11A
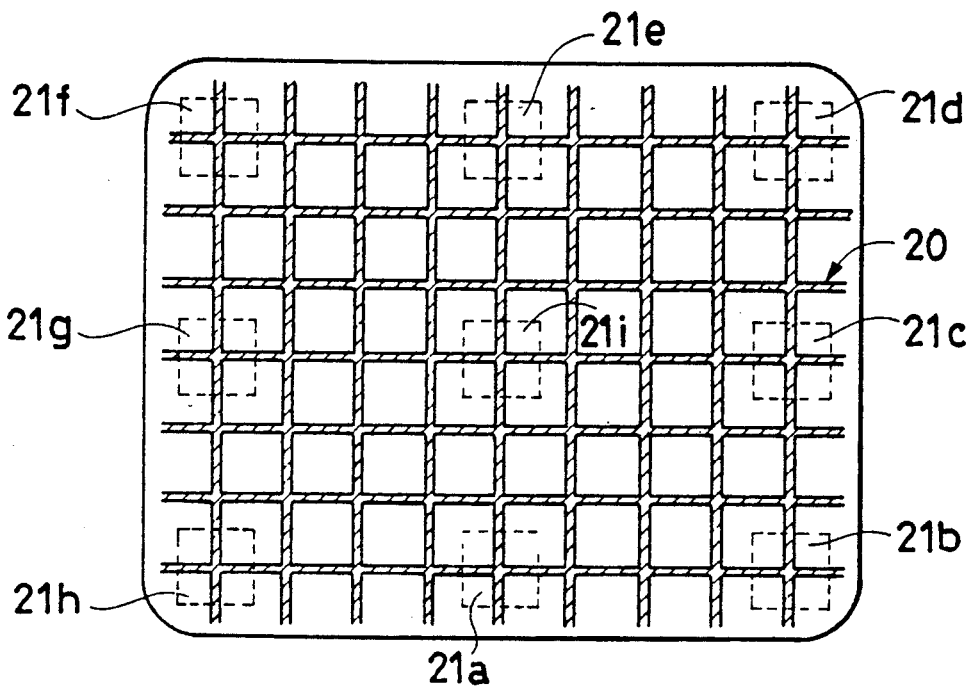
FIG.11B
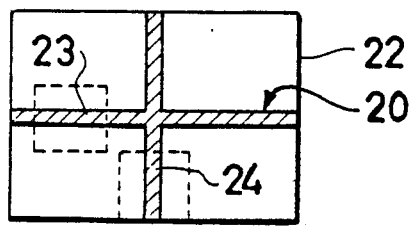
FIG.11C
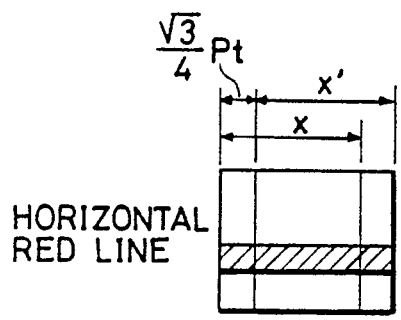
HORIZONTAL RED LINE
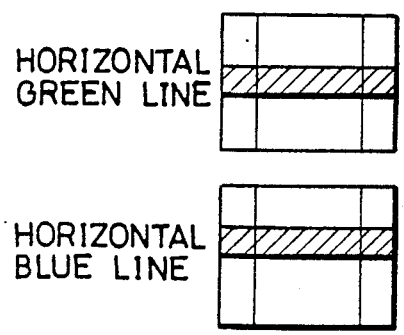
HORIZONTAL GREEN LINE
HORIZONTAL BLUE LINE
FIG.11D
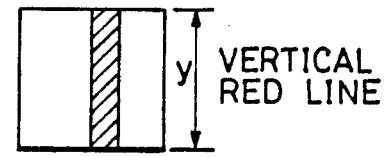
VERTICAL RED LINE
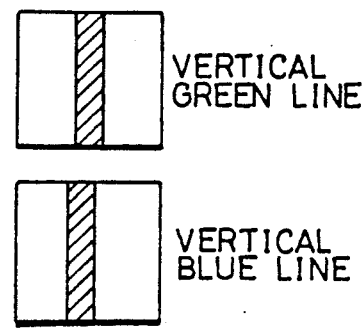
VERTICAL GREEN LINE
VERTICAL BLUE LINE

DEVICE FOR MEASURING A CHARACTERISTIC OF A COLOR CATHODE RAY TUBE

BACKGROUND OF THE INVENTION AND RELATED ART STATEMENT

This invention relates to a device for measuring convergence of three primary color electron beams of red, green and blue of a color cathode ray tube.

The color cathode ray tube (referred to as CRT hereinafter) displays a color image by directing each of the red, green and blue electron beams, controlled by video signal, correspondingly to the red, green and blue phosphor dots on the inner surface of the faceplate. The faceplate is composed of numerous red, green and blue phosphor dots deposited in a mosaic pattern.

In adjusting a color CRT, its convergence is measured and adjusted so that a properly colored display is obtained by assuring that the red, green and blue electron beams pass through any mesh of the shadow mask and accurately strike respective color phosphor dots. It is well known that convergence measurement devices are conventionally used to adjust convergence of the color CRT. Japanese Unexamined Patent Publication No. 59-747880 discloses a device in which a white composite test pattern for measurement is presented on the color CRT for convergence measurement; the test pattern is separated into red, green and red patterns using color filters; each separated pattern is then measured using an industrial television camera of which output is then used to calculate a luminous center of the test pattern of each color; and calculated relative positional difference is considered as a misconvergence to be compensated for.

The convergence measurement using a measurement device mentioned above requires a longer measuring time because the red, green, blue color test patterns are required to be separately picked up prior to the convergence calculation.

The longer measuring time causes the measurement device to operate under undesirable measurement condition changes such as supply voltage variations and luminance changes of the CRT due to generation of external noise or due to disagreemnet of the scan timing of the CRT and the scan timing of the image pickup device while the red, green, blue color patterns are individually picked up. Consequently, measurement accuracy may be degraded.

Also, the conventional device needs a fixture to mechanically keep both the color CRT and the industrial television camera securely in place during color filter changing operations. The fixture causes the size of the device to be larger.

Minolta Camera Kabushiki Kaisha, an asignee of the present application, has filed Japanese Patent Application No. 62-259088 which discloses a convergence measurement device using a color image pickup device to solve the above-mentioned problems. This convergence measurement device enables red, green and blue test patterns to be measured together at a time while, providing one shorter measuring time. The device also assures easy measurement operation of simply placing the color filter built-in image pickup device against the viewing screen of the CRT. The test pattern on the color CRT are produced by red, green, blue phosphor dots which are periodically spaced and mosaically arranged on the viewing screen of the CRT. In a color image pickup device provided with a single filter plate having mosaically-arranged three color filters, also, a great number of pixels are periodically spaced or distributed. It should be noted that a single color phosphor dot is picked up by a plurality of three color pixels. Accordingly, the measurement in which red, green, and blue test patterns are separately processed involves errors due to positional relation between the arrangement of the color phosphor dots on the color CRT and the arrangement of color pixels in the color image pickup device. When the color image pickup device is manually handled for quick measurement of convergence, different measurements are liable to generate due to the fact that the color image pickup device is unavoidably placed on different positions on the viewing screen.

Reasons why such an error takes place will be seen from the following description. FIG. 27 shows a cross hatch pattern displayed on the color CRT. To measure convergence, a horizontal misconvergence is obtained by a vertical line of the cross hatch pattern and a vertical misconvergence is obtained by a horizontal line of the cross hatch pattern. An area indicated at A in FIG. 27 is expanded in FIG. 28 to show in detail. Small circles represent regularly arranged phosphor dots. Phosphor dots given letters R, G, and B represent red phosphor dots, green phosphor dots, and blue phosphor dots respectively. A first area where blue phosphor dots are glowing is enclosed by two parallel alternate long and short dash lines. A second area where red phosphor dots are glowing is enclosed by two parallel alternate long and two short dash lines. A third area where green phosphor dots are glowing is enclosed by two parallel dashed lines. Pt is a vertical pitch between the phosphor dots of one color. FIG. 28 shows a part of the viewing screen of an unadjusted color CRT in which red, green, and blue luminance lines are still misconverged. A horizontal misconvergence is obtained by calculating respective luminous centers of gravity of misconverged red, green, and blue glowing lines to provide respective positional data of the three color test patterns, and by calculating a difference between the positional data. In the same manner as above, a vertical misconvergence is obtained in an area indicated at B FIG. 27.

FIG. 29 shows an arrangement of pixels of a color image pickup device. It is noted that a CCD (Charge Coupled Device) has a color filter alternately striped with red, green, and blue parts, and that pixels are arranged vertically as well as horizontally in respective uniform pitches. The pixels given letters R, G, and B represent red pixels, green pixels, and blue pixels respectively. Pt' is a horizontal pitch between the pixels of one color. Since Pt' is greatly smaller than color phosphor dot pitch Pt shown in FIG. 28, the plurality of red, green, and blue pixels receive light from the glowing phosphor dot when the color image pickup device is picking up the test pattern.

It is now assumed that a horizontal luminous center of gravity of the green phosphor dots is being calculated. The plurality of red, green, and blue pixels receive light from one green phosphor dot. However, the green pixels receive the light most strongly. Consequently, the image pickup device gives a color image of green stripes enclosed by a circle as shown in FIG. 30A and FIG. 30B. Each circle represents a glowing green phosphor dot and vertical hatched stripes inside the circle are a resultant image by the green pixels.

FIG. 30A and FIG. 30B show that the luminous center of gravity of the green phosphor dot image does not agree with the luminous center of the green phosphor dot itself. Two different phosphor dot images on two different columns give different results in the luminous center of gravity, although the green phosphor dot images on the same column agree to each other in luminous center of gravity. This is because green stripes (hatched) on the right hand side column and those on the left hand side column are out of phase as shown in FIG. 30A.

Deviation thus results as shown in FIG. 30A. A line Ms represents the luminous center of gravity of the glowing green phosphor dots themselves and a line Mm represents the luminous center of gravity of the glowing green phosphor dot image on the image pickup device.

If a deviation occurs in the horizontal positional relation between the pixels of the image pickup device and the color phosphor dots of the CRT under test, the above mentioned Mm varies. Accordingly, it could be seen that deviation δ between Mm and Ms changes each time the color image pickup device is moved. FIG. 30B shows that a horizontal movement of the image pickup device relative to the phosphor dots causes the deviation δ to change with respect to that of FIG. 29A.

When convergence is measured from the luminous center of color phosphor dot line of each color, a slight movement of the color image pickup device relative to the color phosphor dots at each measurement causes convergence data to vary, degrading measurement accuracy. This is mainly due to relative changes in positional relation between the arrangement of phosphor dots on the viewing screen of the CRT and the arrangement of the pixels in the color image pickup device. Experimentally, it is found that a relation of a phosphor dot pitch of 310 μm (Pt) and a pixel pitch of 30 μm (Pt') causes horizontal convergence data to vary in the term of 30 μm or more.

Also, changed positioning of the image pickup device varies the position of calculation area for luminous center of gravity, consequently causing an increased measurement fluctuation.

SUMMARY OF THE INVENTION

Accordingly, it is an object of the present invention is to provide a device for measuring convergence of a color CRT which makes it possible to keep measurement variations to a minimum by properly controlling image magnification of an color image pickup device even when the color image pickup device is placed on any position of the viewing screen of the CRT.

A device for measuring convergence of a color CRT of the present invention comprises image pickup means for producing three color image signals with respect to three color test patterns constituting a composite test pattern presented on a viewing screen of a color CRT, change means for changing the image magnification of the image pickup means according to the pitch between color phosphor elements on the viewing screen, and calculation means for calculating respective luminous centers of gravity of the three color test patterns from the three color image signals, and calculating a misconvergence of the color CRT from the calculated luminous centers of gravity and a changed image magnification.

Also, a device for measuring convergence of a color CRT of the present invention comprises image pickup means for producing three color image signals with respect to three color test patterns constituting a composite test pattern presented on a viewing screen of a color CRT, a first setting means for setting a first horizontal sampling area having a length which is obtained by multiplying a pitch between the same horizontal color phosphor elements on the viewing screen and an integer, a first calculation means for calculating first respective vertical luminous centers of gravity of the three color test patterns from the three color image signals from the first horizontal sampling area, a second setting means for setting a second horizontal sampling area which is deviated in a horizontal direction by a given amount from the first horizontal sampling area, a second calculation means for calculating second respective vertical luminous centers of gravity of the three color test patterns from the three color image signals from the second horizontal sampling area, and misconvergence calculation means for calculating a vertical misconvergence of the color CRT from the first and second vertical luminous centers of gravity calculated by said first and second calculation means.

Further, a device for measuring convergence of a color CRT of the present invention comprises image pickup means for producing three color image signals with respect to three color test patterns constituting a composite test pattern presented on a viewing screen of a color CRT, a first setting means for setting a first vertical sampling area having a length which is obtained by multiplying a pitch between the same vertical color phosphor elements on the viewing screen and an integer, a first calculation means for calculating first respective horizontal luminous centers of gravity of the three color test patterns from the three color image signals from the first vertical sampling area, a second setting means for setting a second vertical sampling area which is deviated in a vertical direction by a given amount from the first vertical sampling area, a second calculation means for calculating second respective horizontal luminous centers of gravity of the three color test patterns from the three color image signals from the second vertical sampling area, and misconvergence calculation means for calculating a horizontal misconvergence of the color CRT from the first and second horizontal luminous centers of gravity calculated by said first and second calculation means.

As mentioned above, in a device of the present invention, a composite test pattern presented on the viewing screen of the CRT is so magnified that the pitch between color phosphor elements on the viewing screen and the pitch between pixels on the color image pickup means have a specified proportional relationship to each other, and can be picked up by the image pickup means. The color image pickup means separates the composite test pattern into three color test patterns or three color image signals. The three color image signals are fed to a video memory where they are separately stored. Based on each of the color image signals, a processor/controller calculates a luminous center of gravity for each color test pattern, calculating a misconvergence by comparison of respective luminous centers of gravity of the three color test patterns.

Consequently, the device of the present invention minimizes measurement variations which is likely to occur due to undesirable movements of the color image pickup means relative to the color CRT, ensuring measurement accuracy at every test.

In the device where a horizontal misconvergence (or vertical misconvergence) is calculated on a vertical line portion (or a horizontal line portion) of the test pattern, a vertical sampling area (a horizontal sampling area) is set which has a length which is obtained by multiplying a pitch between the same vertical color phosphor elements (or the same horizontal color phosphor elements) on the viewing screen and an integer, and respective luminous centers of gravity of the three color test patterns is calculated from the three color image signals from the sampling area, and another sampling area is set which is deviated in a vertical direction (or a horizontal direction) by a given amount from the former sampling area, and respective luminous centers of gravity of the three color test patterns is calculated from the three color image signals from the another sampling area, and a horizontal misconvergence is finally calculated from the calculated luminous centers of gravity of the two sampling areas, the calculation of luminous centers of gravity of three color test patterns receives a remarkably reduced influence of undesirable movement of the image pickup means, such as vertical movement, horizontal movement, or oblique movement in the course of measurement. Consequently, fluctuation in repeated measurements is reduced.

These and other objects, features and advantages of the present invention will become more apparent upon a reading of the following detailed description and drawings.

BRIEF DESCRIPTION OF THE DRAWINGS

FIG. 5A and FIG. 5B are diagrams showing an arrangement of green, and blue phosphor dots on a horizontal line of a cross hatch pattern to calculate a vertical luminous center of gravity;

FIG. 6A through FIG. 6D are diagrams showing measurement areas for measuring convergence over a cross hatch pattern;

FIG. 11A through FIG. 11D are diagrams showing another measurement areas for measuring convergence over a cross hatch pattern;

DETAILED DESCRIPTION OF PREFERRED EMBODIMENTS OF THE INVENTION

Figure 1:
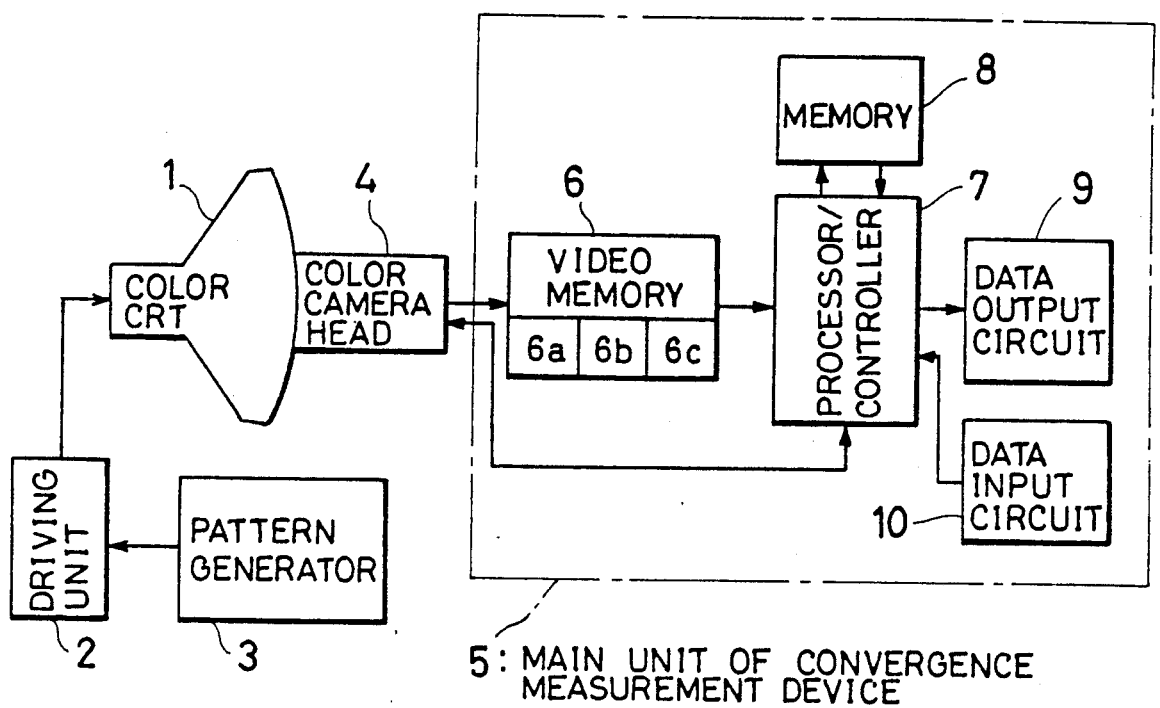
FIG. 1 is a block diagram showing a whole construction of a first embodiment of the present invention.

FIG. 1 shows a whole construction of a first embodiment of the present invention. A composite test pattern for measurement is generated by a pattern generator 3, and fed via a driving unit 2 to a color CRT 1 where the test pattern is presented on its viewing screen.

The composite test pattern consists of three color test patterns, i.e., red test pattern, green test pattern, and blue test pattern. A color camera head 4, which is placed in front of the CRT while facing the viewing screen, picks up the composite test pattern with a built-in CCD device. The color camera head enables an easy setting to required measurement points one after another over the viewing screen of the CRT 1 because the color camera head can be simply pressed manually against the viewing screen. The color camera head 4 then separates the picked up test pattern image into red, green, and blue test pattern images, each of which is transferred to a video memory 6 provided in a main unit 5 for convergence measurement. The main unit 5 comprises the video memory 6, a processor/controller 7, a memory 8, a data output circuit 9 and a data input circuit 10. Each of them is described more in detail below.

The video memory 6, made up of a A/D converter and backup memories 6a, 6b and 6c, converts analog image data of each color into red, green, and blue digital image data, which are separately stored in backup memories 6a, 6b and 6c respectively. With a micro processor, the processor/controller 7 controls the operation of the convergence measuring device in accordance with a program stored in the memory 8, and also performs arithmetic operations to calculate convergence of the CRT based on the digital data of color image stored in the video memory 6. The memory 8 stores the resultant convergence data, which is also transferred to a data output circuit 9. A data input circuit 10 receives external data and transfers it to the processor/controller 7.

Figure 2:
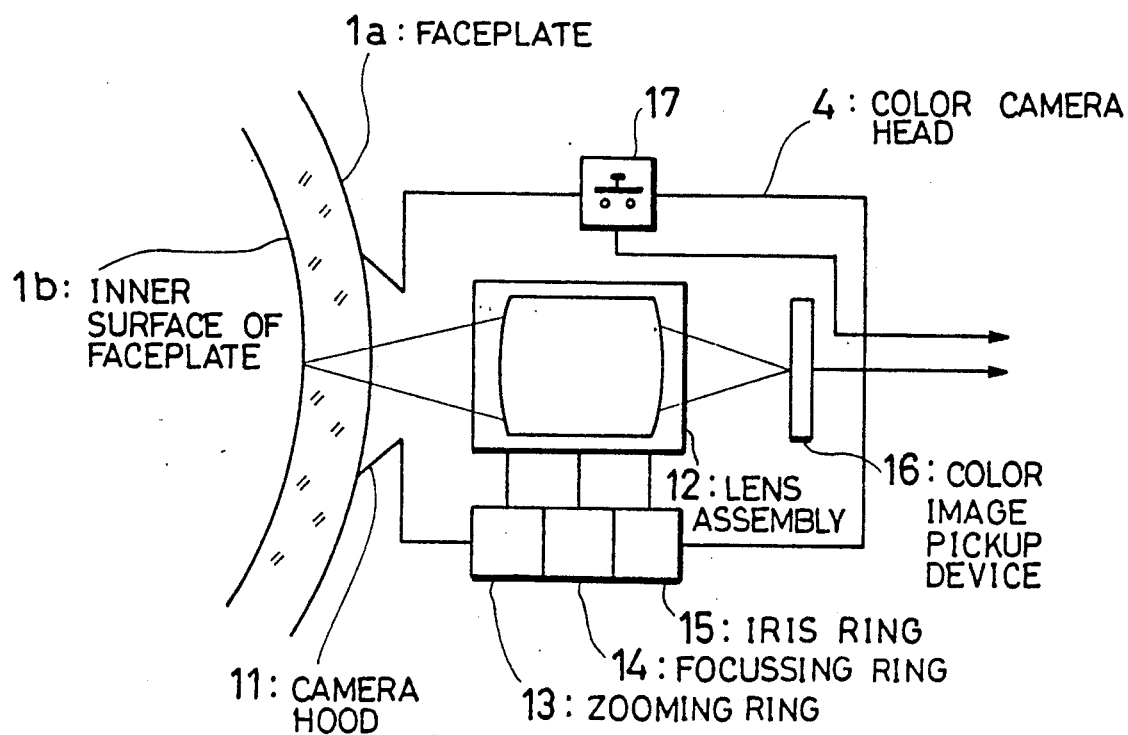
FIG. 2 is a diagram showing a construction of a color camera head of the first embodiment, including a CCD color image pickup device.

The color camera head 4 is diagrammed in detail in FIG. 2 to describe a first embodiment of this invention. With its camera hood 11 directly touching to the faceplate 1a of the CRT 1, the camera head 4 can be set to a measurement area over the viewing screen. The test pattern within the measurement area on the viewing screen is magnified through a lens assembly 12 and then picked up by a color image pickup device 16.

The lens assembly 12 provides a zoom control to control magnification, a focus control and an iris control, controlled by a zooming ring 13, a focussing ring 14 and an iris ring 15 respectively. The zooming ring 13 is graduated to indicate phosphor dot pitch numbers. The camera head 4 has a fixed ring provided with a reference mark. A manual magnification setting is carried out by turning the zooming ring 13 until the reference mark agrees with a graduated pitch number on the zooming ring 13 showing the phosphor dot pitch of the color CRT under test. Conversely, the zooming ring 13 may be notched for a reference mark, and the fixed ring on the camera head may be graduated to indicate pitch numbers.

The color image pickup device 16 has, in front of the color pixels, a built-in color separating filter which has filtering sections arranged in the same matrix as the color pixels. The pixels pick up the test pattern in the form of a color image. The pixels discriminate the pattern image in accordance with colors at each pixel, and each pixel outputs signal for one of the three colors. A switch 17 is a measurement start switch. When it is switched on, a trigger signal is transmitted to the processor/controller 7.

Figure 30A:
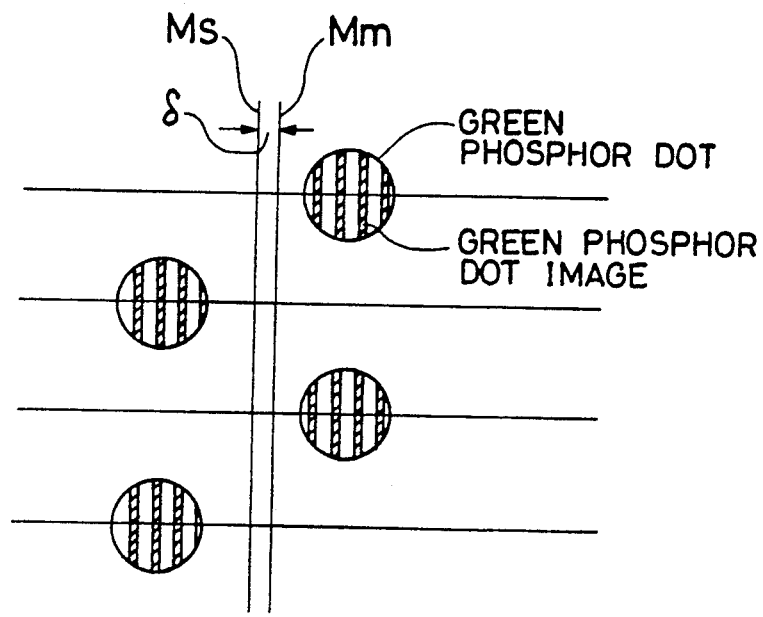
FIG. 30A and FIG. 30B are diagrams showing examples of a green phosphor dot image.
Figure 30B:
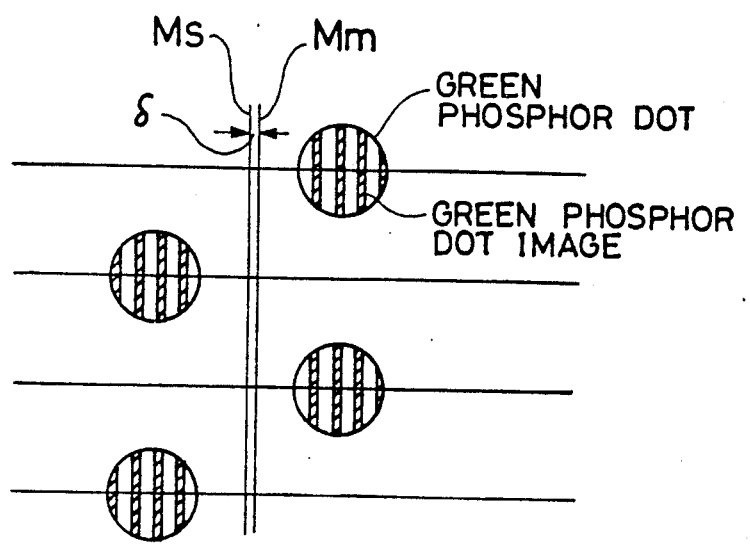

Described below is how convergence is measured in this embodiment. As previously mentioned, fluctuation in misconvergence measurement changes with magnification in the image picking up process. As shown in FIGS. 30A and 30B, the stripe pattern of the green image caused by picking up one green phosphor dot changes with magnification. Also, respective luminous centers of gravity of the green phosphor dots on a line changes with magnification. Consequently, the green luminous center of gravity of the green phosphor line changes with magnification. Accordingly, it could be seen that the fluctuation can be reduced by selecting a proper magnification.

Figure 3A:
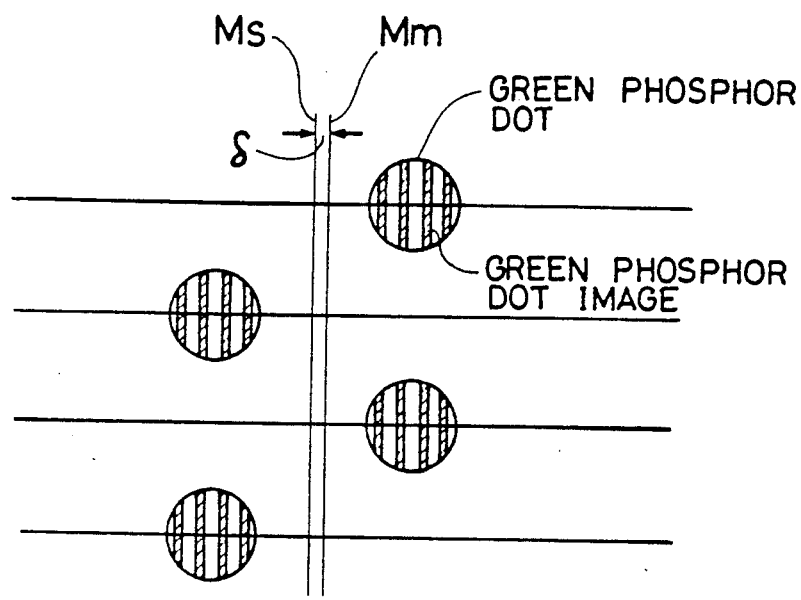
FIG. 3A and FIG. 3B are diagrams showing photographed images of green phosphor dots when photographing a test pattern with different magnifications.
Figure 3B:
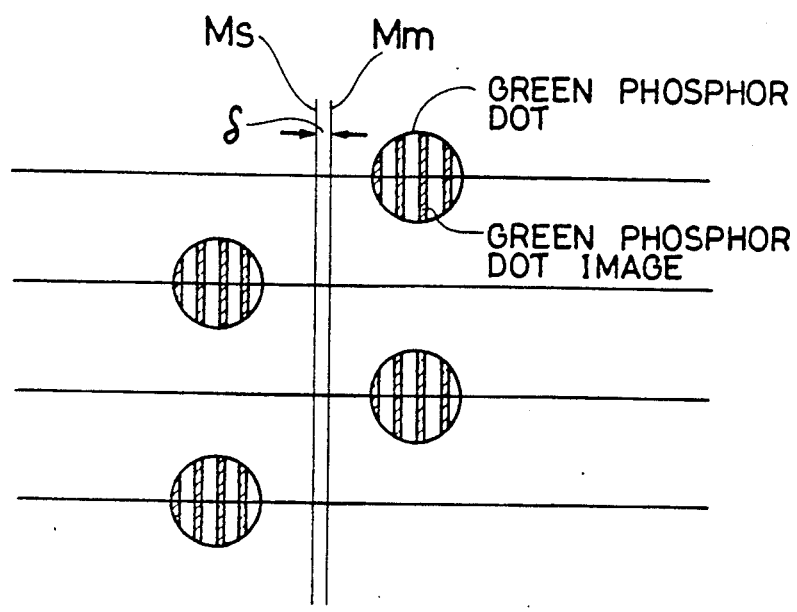

Referring to FIG. 3A, the magnification is changed so that the stripe pattern of the phosphor dots on the right column and the strip pattern of the phosphor dots on the left column come to be identical to each other. FIG. 3B shows that with the color camera head 4 slightly moved on the viewing screen of the color CRT 1, the strip pattern of the phosphor dots becomes different from that of FIG. 3A. It is noted that the fluctuation of deviation δ between Ms (luminous center of gravity of phosphor dot itself) and Mm (luminous center of gravity of phosphor dot image) does not vary regardless of the movement of the color camera head 4 on the viewing screen.

Figure 29:
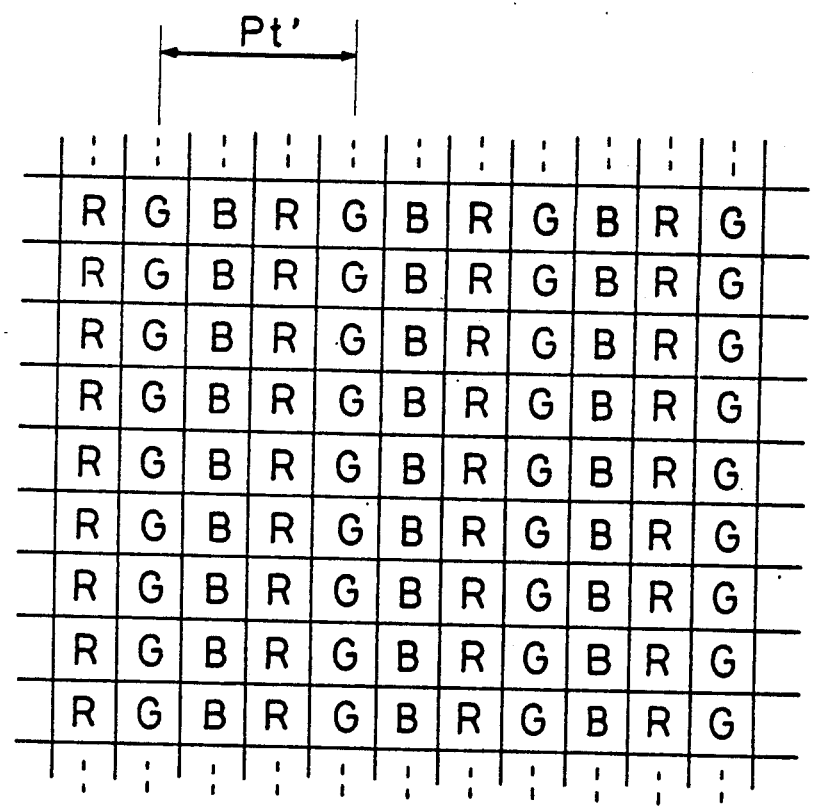
FIG. 29 is a diagram showing an arrangement of red, green, and blue pixels on a color image pickup device.

From experiments and simulation tests, it has been found that a minimum fluctuation in misconvergence measurement is obtainable with respect to the vertical movement, horizontal movement, and rotational movement (around the optical axis) of the camera head 4 over the viewing screen of the CRT when the magnification is set at such a value that a horizontal pitch between the same color phosphor dot images is equal to $2n \times Pt'$ ($n \geq 10$). Pt' is a pitch between the same color pixels of the image pickup device. Pt is a vertical pitch of the phosphor dots of one color. Also, it has been found that in the case of setting the color camera head 4 at the horizontal position or rotating the the pixel arrangement shown in FIG. 29 90 degrees around the optical axis, a minimum fluctuation in misconvergence measurement is obtainable with respect to the vertical movement, horizontal movement, and rotational movement (around the optical axis) of the camera head 4 over the viewing screen of the CRT when the magnification is set at such a value that a vertical pitch between the same phosphor dot images is equal to $(n+\frac{1}{2}) \times Pt'$ ($n \geq 11$).

When the pixels of each color of the image pickup device are in a stripe arrangement, magnification $\beta$ of the lens assembly 12 in the camera head 4 is set as follows:

$$\beta = 20 \cdot Pt'/Pe$$

When the camera head 4 is used with the camera head 4 rotated 90 degrees, magnification $\beta$ is set as follows:

$$\beta = 11.5 \cdot Pt'/Pt$$

The above-mentioned equations shows that a constant pitch between dot images is held in the image pickup device regardless of varying phosphor dot pitchs. In the former case, the ratio Po of a phosphor dot pitch to a pixel pitch is 20, and in latter case, Po is 11.5. When the pixel pitch Pt' is 34.5 μm, optimum magnification $\beta$ is listed with respect to a number of phosphor dot pitches in the following Table.

TABLE

| Phosphor dot pitch Pt(mm) | Magnification $\beta$ |
| --- | --- |
| 0.48 | 0.83 |
| 0.39 | 1.02 |
| 0.36 | 1.11 |
| 0.31 | 1.29 |
| 0.26 | 1.53 |
| 0.21 | 1.89 |

Figure 4:
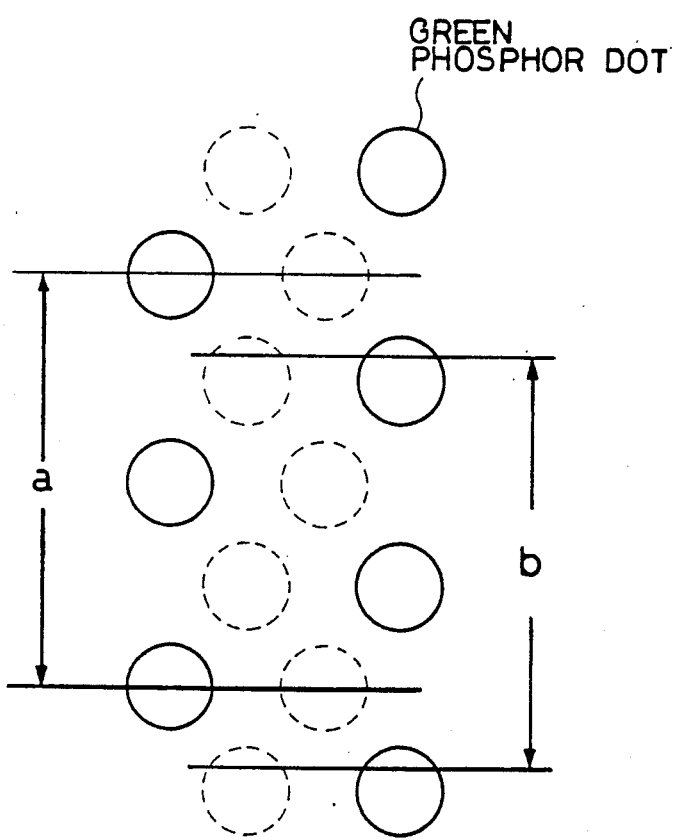
FIG. 4 is a diagram showing a vertical sampling range for calculation of a horizontal luminous center of gravity of green dot images.

When the camera head 4 is moved horizontally or vertically, the reference point of measurement moves accordingly. Accordingly, measurements considerably fluctuate with movement of the camera head 4. Such measurement fluctuation, however, can be reduced by setting a proper sampling area for calculation. In measuring the horizontal luminous center of gravity, for example, the sampling area is set which has a vertical length equal to the product of the vertical phosphor dot pitch Pt and an integer. The number of phosphor dots within the sampling area is constant even when the camera head 4 is moved. Accordingly, the luminous center of gravity will be kept constant. FIG. 4 shows two sampling areas which have a vertical length a and a vertical length b respectively. Both the vertical lengths a and b are equal to twice the vertical phosphor dot pitch Pt. It can be seen that the luminous center of gravity obtained in the sampling area having the vertical length a is identical to that of the sampling area having the vertical length b. Similarly, the vertical luminous center of gravity can be obtained by setting a sampling area having a vertical length equal to the product of the horizontal phosphor dot pitch Pe and an integer. In the case of calculating the vertical luminous center of gravity, however, an error is likely to occur if the camera head 4 is unintentionally rotated. Accordingly, the following averaging calculation is carried out.

FIG. 5A and FIG. 5B show green and blue phosphor dots in a horizontal line of a cross hatch pattern for calculating the vertical luminous center of gravity. Circles drawn by solid lines represent green phoshor dots. Circles drawn by broken lines represent blue phosphor dots. In FIG. 5A, a first sampling area is shown to have a horizontal length a' equal to the horizontal phosphor dot pitch $$Pe (= \sqrt{3}Pt).$$

In the first sampling area are contained two green phosphor dots G1 and G2 and two blue phosphor dots B1 and B2. The green phosphor dots G1 and G2 make a luminous center Dg of green phosphor dot in the first sampling area. Also, the blue phosphor dots B1 and B2 make a luminous center Db of blue phosphor dot in the first sampling area. Indicated at d is a horizontal distance between Dg and Db. It should be noted that no vertical difference occurs between Dg and Db when the camera head 4 is placed in the horizontal position. However, when the camera head 4 is rotated by $\theta$ around its optical axis as shown in FIG. 5A, Db deviates with respect to Dg by $d \times \sin \theta$.

FIG. 5B shows a state in which the first sampling area is moved in a horizontal direction by a distance l. In the moved sampling area or a second sampling area are contained two green phosphor dots G1 and G2 and two blue phosphor dots B2 and B3. The green phosphor dots G1 and G2 has the luminous center Dg. The blue phosphor dots B2 and B3 make a luminous center Db' of blue phosphor dot in the second sampling area. Indicated at d' is a horizontal distance between Dg and Db'. No vertical difference occurs between Dg and Db' when the camera head 4 is placed in the horizontal position. However, when the camera head 4 is rotated by $\theta$, Db' deviates with respect to Dg by $-d \times \sin \theta$. When the distance l is Pe/4, the vertical deviation direction of the first sampling area and that of the second sampling area are opposite to each other. By averaging the luminous centers of gravity of the first sampling area and those of the second sampling area, accordingly, a remarkably reduced measurement error is involved compared with measurement errors occuring in only one of the first sampling area and the second sampling area.

Described above is the averaging calculation for the vertical luminous centers of gravity. Such averaging calculation can be performed in a similar manner to determine the horizontal luminous centers of gravity by setting two sampling areas with one apart from the other by Pt/4 in a vertical direction.

This averaging concept has been described with reference to a color CRT having a viewing screen provided with phosphor material in the form of dots. However, it should be noted that this concept is applicable to measurement of a color CRT having a viewing screen provided with phosphor material in the form of stripes. In the measurement of the stripe-type color CRT, when the distance l is Pe/2, Pe being a pitch between the same color stripes, the vertical deviation direction of a first sampling area and that of a second sampling area are opposite to each other. Pe is a pitch between the same color stripes. Accordingly, measurement error is considerably reduced compared with measurements not including such averaging calculation.

The following describe how convergence is measured in this embodiment referring to FIG. 6 through FIG. 11. FIG. 6A illustrates a cross hatch pattern 20 produced on the whole viewing screen on the color CRT 1 to be measured. Indicated at 21a through 21i are portions for measurement of convergence. The portion 21a is expanded in FIG. 6B. A boxed area 22 indicated at FIG. 6B is an image obtained by the image pickup device. A vertical convergence is calculated in a horizontal line 23 of the cross hatch pattern 20, and a horizontal convergence is calculated in a vertical line 24 of the cross hatch pattern 20. FIG. 6C shows each of red, green, and blue horizontal lines separated from a horizontal composite line 23 of the portion. In FIG. 6C, a first sampling area having a horizontal length x and a second sampling area having a horizontal length x' are deviated from each other by $$\sqrt{3}Pt/4 (= Pe/4)$$

to average measurements of the two sampling areas as mentioned above.

FIG. 6D shows each of red, green, and blue lines separated from a vertical composite line 24 of the portion. In FIG. 6D, a first sampling area having a vertical length y and a second sampling area having a vertical length y' are deviated from each other by Pt/4 to average measurements of the two sampling areas as mentioned above.

Figure 7:
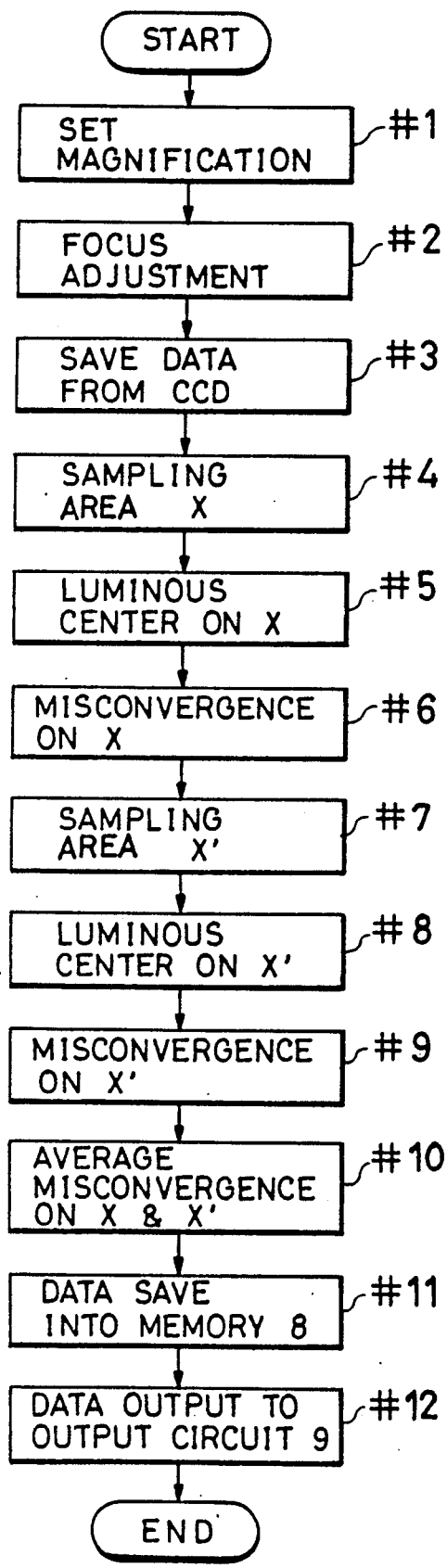
FIG. 7 is a flowchart showing a vertical convergence measurement of the first embodiment.

Referring to a flowchart shown in FIG. 7, the measurement process of a vertical convergence is described below. Magnification matched to a phosphor dot pitch of the color CRT 1 under test is first manually set by turning the zooming ring 13 on the color camera head 4, and then the set magnification value (or phosphor dot pitch data) is transferred to the processor/controller 7 via the data input circuit 10 (Step #1). As already mentioned, the camera head 4 is set by turning the zooming ring 13 in such a way that a desirable magnification corresponds to the phosphor dot pitch of the color CRT under test. Also, the magnification is used when resultant misconvergence data is converted in to actual dimensional values in $\mu$m. At Step #2, the focus of the lens assembly 12 is adjusted. Subsequently, the measurement start switch 7 is switched on to operate the color image pickup device 16 to pick up a test pattern on the viewing screen. The pattern image picked up by the image pickup device 16 is separated into red, green, and blue images, each of which is again separately stored into the video memory 6 in the main unit 5 (Step #3). The processor/controller 7 sets a first sampling area having a horizontal length x (Step #4), and calculates luminous centers of gravity Rdx of red phosphor dots, Gdx of green phosphor dots, and Bdx of blue phosphor dots in the first sampling area x based on the color image data stored in the video memory 6 (Step #5). The processor/controller 7 further calculates vertical differences $\Delta$Rx and $\Delta$Bx of Rdx and Bdx with respect to Gdx (Step #6). These are misconvergences in the first sampling area x. The processor/controller 7 sets a second sampling area having a horizontal length x' (Step

7), and calculate luminous centers of gravity Rdx' of red phosphor dots, Gdx' of green phosphor dots, and Bdx' of blue phosphor dots in the second sampling area x' based on the color image data stored in the video memory 6 (Step #8). The processor/controller 7 further calculates vertical differences ΔRx' and ΔBx' of Rdx' and Bdx' with respect to Gdx' (Step #9). These are misconvergences in the second sampling area x'. The processor/controller 7 calculates averaged misconvergences Rx, Bx of the misconvergences ΔRx and ΔBx of the first sampling area x and the misconvergences ΔRx' and ΔBx' of the second sampling area x' (Step #10). The averaged misconvergences Rx and Bx are stored in the memory 8 (Step #11) and simultaneously transferred to the data output circuit 9 (Step #12).

Figure 8:
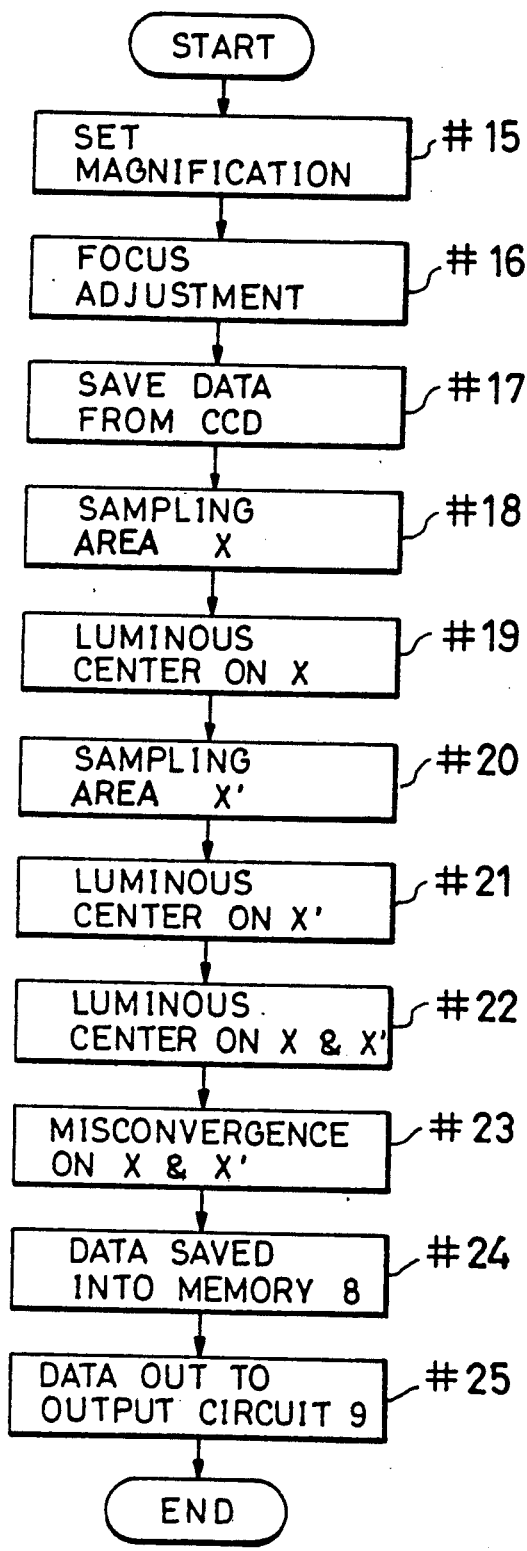
FIG. 8 is a flowchart showing another vertical convergence measurement of the first embodiment.

In the above manner (referred to as Manner 1 hereinafter), it is first carried out to calculate misconvergences in each of the first sampling area x and the second sampling area x', and they are averaged to provide a misconvergence of the line. Alternatively, it is first carried out to calculate luminous centers of gravity in each of the first sampling area x and the second sampling area x', and respective intermediate points between the luminous centers of gravity of the first sampling area and the luminous centers of gravity of the second sampling area, which are then be used to calculate a misconvergence of the line. This manner is hereinafter referred to as Manner 2. Referring to FIG. 8, Manner 2 will be described below.

Similarly to Manner 1, magnification matched to a phosphor dot pitch of the color CRT 1 under test is first manually set by turning the zooming ring 13 on the color camera head 4, and the magnification value (or phosphor dot pitch data) is transferred to the processor/controller 7 via the data input circuit 10 (Step #15). In Step #16, the focus of the lens assembly 12 is adjusted. Subsequently, the measurement start switch 7 is switched on to operate the color image pickup device 16 to pick up a test pattern on the viewing screen. The pattern image picked up by the image pickup device 16 is separated into red, green, and blue images, each of which is separately stored in the video memory 6 in the main unit 5 (Step #17). The processor/controller 7 sets a first sampling area having a horizontal length x (Step #18), and calculates luminous centers of gravity Rdx of red phosphor dots, Gdx of green phosphor dots, and Bdx of blue phosphor dots in the first sampling area x based on the color image data stored in the video memory 6 (Step #19). The processor/controller 7 sets a second sampling area having a horizontal length x' (Step #20), and calculate luminous centers of gravity Rdx' of red phosphor dots, Gdx' of green phosphor dots, and Bdx' of blue phosphor dots in the second sampling area x' based on the color image data stored in the video memory 6 (Step #21). The processor/controller 7 calculates intermediate points Rmx (red), Gmx (green), Bmx (blue) between Rdx and Rdx', Gdx and Gdx', and Bdx and Bdx' respectively (Step #22). The processor/controller 7 further calculates deviations of Rmx, Bmx with respect to Gmx (Step #23). These deviations are misconvergences Rx, Bx of the line. Both Rx and Bx are stored in the memory 8 (Step #24) and simultaneously transferred to the data output circuit 9 (Step #25).

Figure 9:
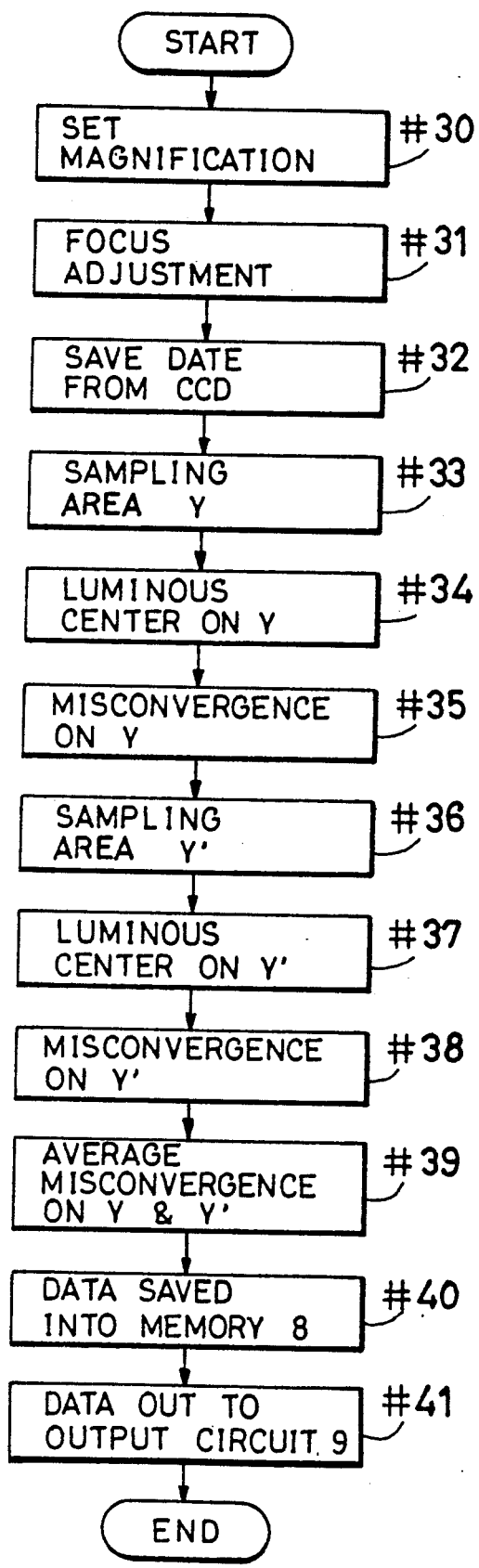
FIG. 9 is a flowchart showing a horizontal convergence measurement of the first embodiment.
Figure 10:
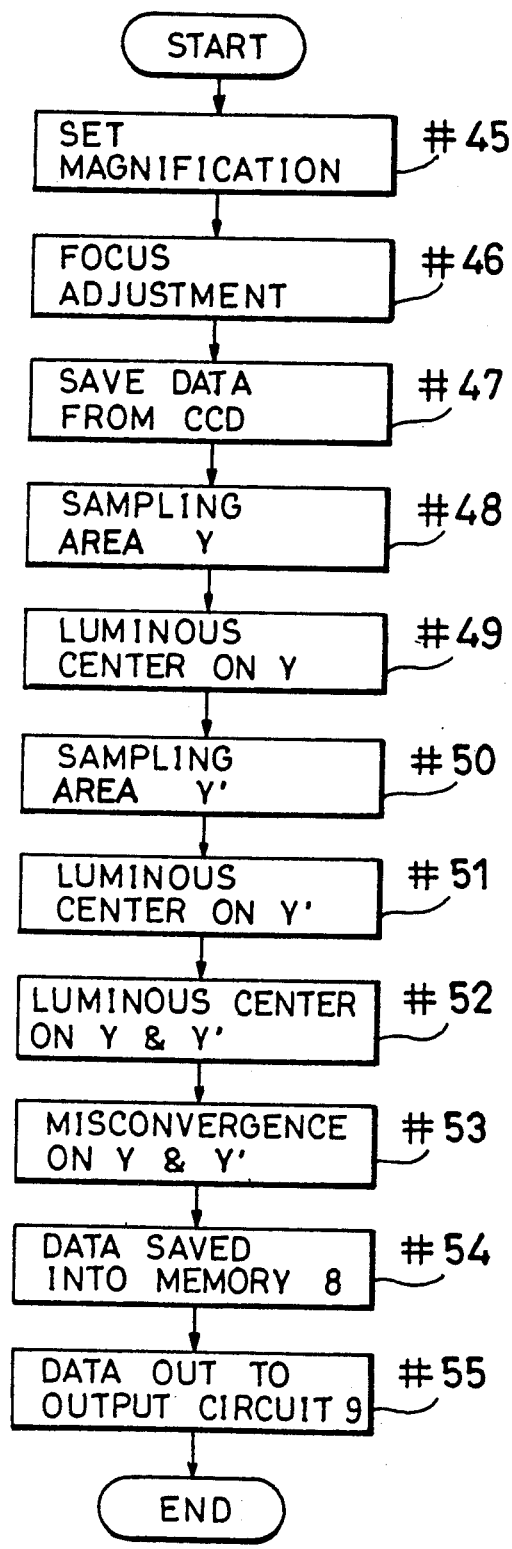
FIG. 10 is a flowchart showing another horizontal convergence measurement of the first embodiment.

The horizontal convergence measurement in the vertical line 24 shown in FIG. 6B is also carried out in the same manner as in the above mentioned vertical convergence measurement, as flowcharts shown in FIG. 9 and FIG. 10. The flowchart in FIG. 9 shows that Manner 1, previously described in connection with the vertical convergence measurement, is applied to the horizontal convergence measurement. The flowchart in FIG. 10 shows that Manner 2 is applied to the horizontal convergence measurement. Description of the flowchart steps in FIG. 9 and FIG. 10 are almost identical to those in FIG. 7 and FIG. 8 respectively except that sampling areas and calculation are made in a vertical direction.

Flowchart steps for the horizontal convergence measurement will be only briefly described below. Referring to the flowchart in FIG. 9, where Manner 1 applies, it is first carried out to calculate misconvergences ΔRy and ΔBy in the first sampling area y with respect to the luminous center of gravity of the green phosphor dots (Step #30 through Step #35). It is then carried out to calculate misconvergence ΔRy' and ΔBy' in the second sampling area y' with respect to the luminous center of gravity of the green phosphor dots (Step #36 through Step #38). Misconvegences Ry and By of the line are obtained by averaging ΔRy and ΔRy', and ΔBy and ΔBy' respectively (Step #39). The misconvergences Ry and By are stored in the memory 8 (Step #40), and simultaneously transferred to the data output circuit 9 (Step #41).

Referring to the flowchart in FIG. 10, where Manner 2 is applied, it is first carried out to calculate luminous centers Rdy (red), Gdy (green) and Bdy (blue) of gravity in the first sampling area y (Step #45 through Step #49). It is then carried out to calculate luminous centers Rdy' (red), Gdy' (green) and Bdy' (blue) of gravity in the second sampling area y' (Step #50 and then #51). Subsequently, it is carried out to calculate intermediate points Rmy (red), Gmy (green), Bmy (blue) between Rdy and Rdy', Gdy and Gdy', Bdy and Bdy' (Step #53). Furthermore, deviations of Rmy and Bmy with respect to Gmy are calculated (Step #53), which are misconvergences Ry, By of the line in Step 53. The misconvegences Ry and By are stored in the memory 8 (Step #54), and simultaneously transferred to the data output circuit 9 (Step #55).

When a color CRT under test is provided with round phosphor dots, the vertical pitch of the phosphor dots is smaller than the horizontal pitch of the phosphor dots. Consequently, the luminous centers of gravity in vertical sampling areas are calculated more accurately than the luminous centers of gravity in horizontal sampling areas. Measurement of a horizontal convergence receives less influence of rotational movement of the camera head 4 than measurement of a vertical convergence. Accordingly, when measuring a horizontal misconvergence, it may be carried out to set only one vertical sampling area as shown in FIG. 11D, which can eliminate the averaging calculation and makes it possible to reduce the measurement time.

Described below is a second embodiment which provides means for controlling magnification of the lens assembly 12 to an optimum setting according to phosphor dot pitchs of the color CRT 1 in the course of convergence measurement.

Figure 12:
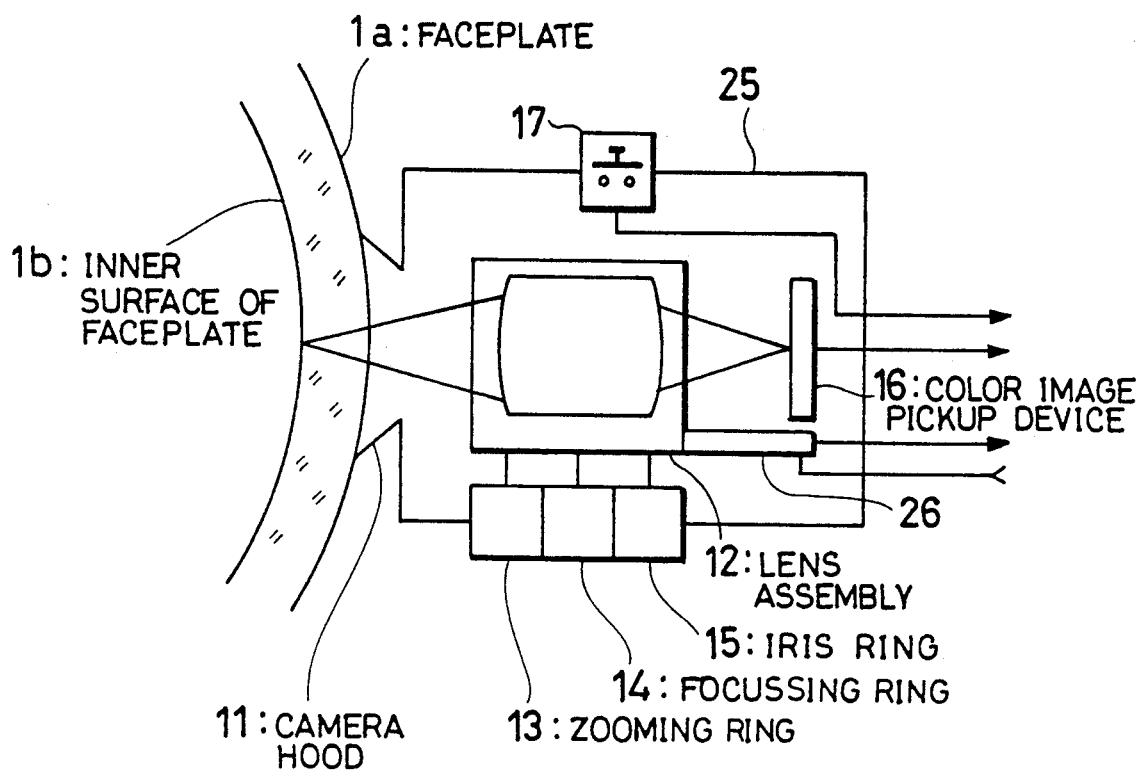
FIG. 12 is a diagram showing a construction of a color camera head of a second embodiment.

FIG. 12 is a diagram showing a color camera head of a convergence measurement device in conjunction with the second embodiment. Denoted numerals are commonly employed in both FIG. 2 and FIG. 12 when members are identical. A color camera head 25 provides a zoom control for optimum setting of magnification of the lens assembly 12, a focus control, and an iris control, controlled by a zooming ring 13, by a focussing ring 14 and by an iris ring 15 respectively. A magnification sensor 26 detects magnification of the lens assembly 12 measuring positions of each element in it. The sensor signal produced by the magnification sensor 26 is used to display a phosphor dot pitch corresponding to the detected magnification of the lens assembly 12 so as to control magnification of the lens assembly 12 to an optimum setting according to the phosphor dot pitch Pt of the color CRT under test.

Figure 13:
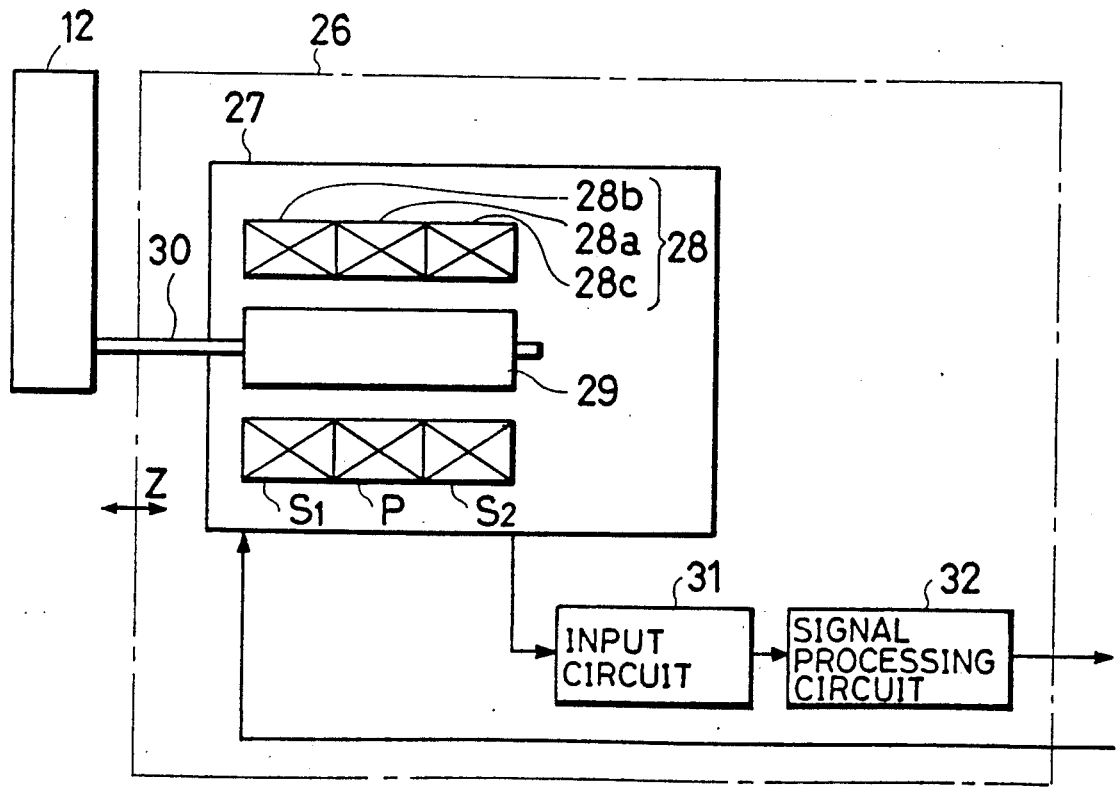
FIG. 13 is a diagram showing a magnification sensor of the second color camera head, including a differential transformer.
Figure 14:
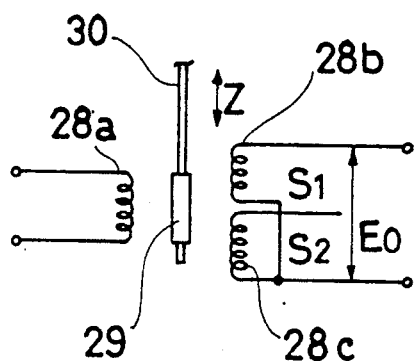
FIG. 14 is a partial schematic diagram of the differential transformer.
Figure 15:
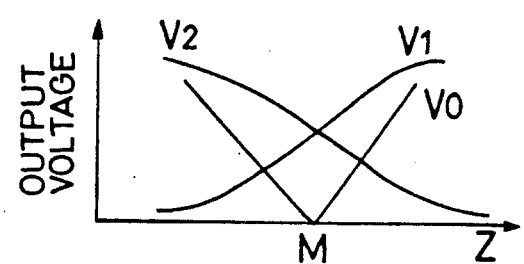
FIG. 15 is a graph showing output characteristics of the differential transformer, the outputs being plotted as a function of position of a lens assembly of the second color camera head.

FIG. 13 is a diagram of a magnification sensor 26 which employs the principle of a differential transformer. FIG. 14 is a partial schematic diagram of the differential transformer 27. The differential transformer 27 includes a primary coil 28a, a core 29, two secondary coils 28b and 28c. The primary coil 28a is electromagnetically coupled with the secondary coils 28b and 28c via the transformer core 29. The core 29 is connected to one end of an sensor bar 30. The other of the core 29 is connected to the lens assembly 12. Accordingly, the core 29 is moved with the lens assembly 12 along an axis of the coil 28 or in the direction of Z in FIG. 14. The primary coil 28a is fed with an analog signal from an oscillator. In response to the movement of the core 29, then the movement of the lens assembly 12, the secondary coils 28b and 28c generate an AC voltage proportional to the movement of the core 29. The resulting voltage is fed to an input circuit 31 and then to a signal processing circuit 32. The input circuit 31 works as a rectifier and the signal processing circuit 32 as a converter to DC signals. FIG. 15 shows output signal from the signal processing circuit 32 in response to the movement of the core 29. A response curve V1 represents a DC output voltage rectified from AC voltage generated by 28b. A response curve V2 represents also a DC output voltage rectified from AC voltage generated by 28c. A response curve Vo represents a DC output voltage rectified from an AC voltage, Eo, which both secondary coils 28b and 28c yield when configured as shown in FIG. 14 so that output from one coil is reverse to that from the other coil in polarity. Referring to FIG. 15, a response curve Vo linearly falls with z reaching a minimum value at Point M, and then linearly rises again with z. Point M represents zero point. As plotted in FIG. 16, the sensor output from the magnification sensor 26 varies in proportion to positional change of lens members of the lens assembly 12. The lens assembly 12, on the other hand, is designed in such a way that its magnification factor is proportional to the position of the lens members of the lens assembly 12 as shown in FIG. 17. Consequently, magnification of the lens assembly 12 is in proportion to the output from the magnification sensor 26. The output from the magnification sensor 26 is fed to the processor/controller 7 where it is converted into digital signals with an AD converter before being read by the microprocessor there.

Figure 18:
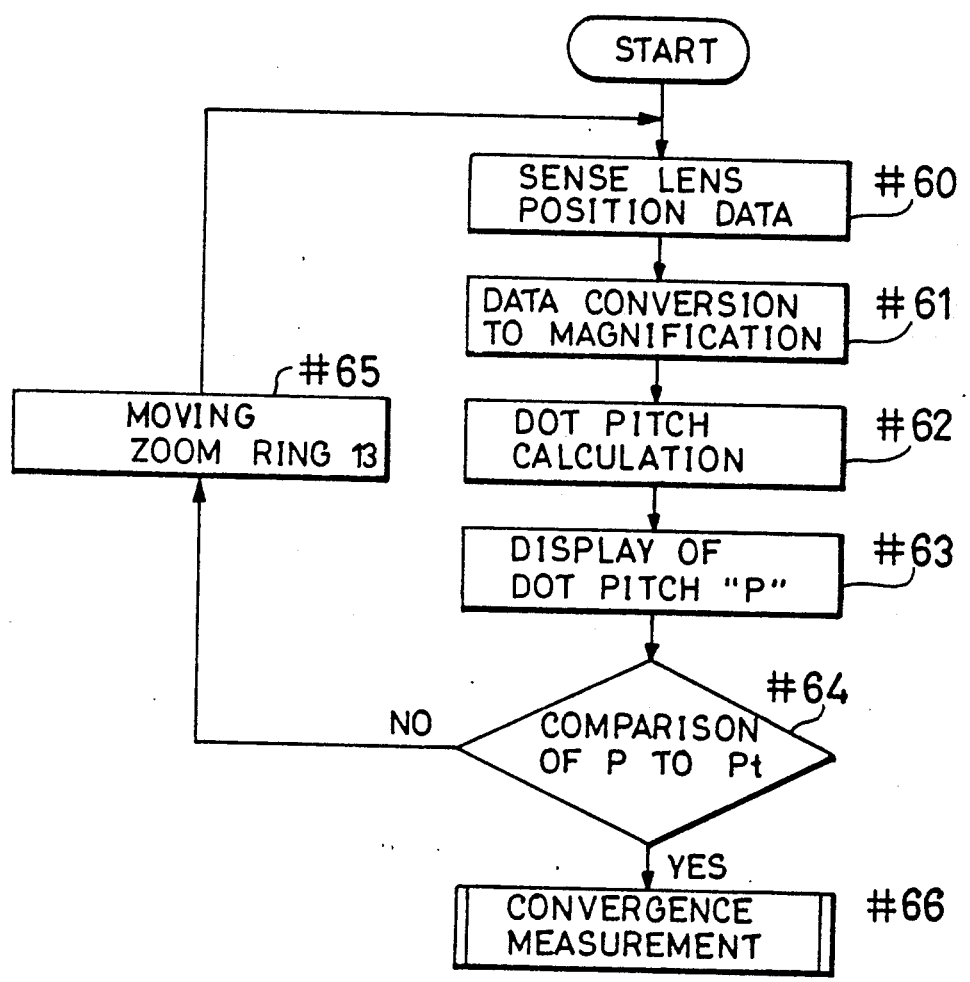
FIG. 18 is a flowchart showing a control process of a zoom ring for optimum magnification setting.

Referring to the flowchart in FIG. 18, convergence measurement process of the color CRT in this embodiment is explained below. In Step #60, the magnification sensor 26 yields an output signal, which directly relates to positional data of the lens members of the lens assembly 12. Then, the process goes to Step #61 where the output signal is converted into a magnification value. Given the magnification value, the optimum phosphor dot pitch P is calculated in Step #62. In Step #63, the calculated pitch P is displayed on the data output 9. The operator compares the pitch value P to the phosphor dot pitch Pt of the color CRT under test in Step #64. The operator knows the phosphor dot pitch Pt prior to measuring. When the pitch P and the phosphor dot pitch Pt do not agree with each other, the magnification of the lens assembly is adjusted by manually moving the zooming ring 13 in Step #65 before returning to Step #60. The operation of Steps #60 through #64 is repeated until the pitch values P and the phosphor dot pitch Pt come into agreement (Step #66).

In the first embodiment, as mentioned above, the magnification of the color camera head 4 is set by turning the zooming ring 13 until a given pitch number agrees with a reference mark. In the second embodiment, however, the magnification of the color camera head 4 is set with confirming pitches corresponding to current magnification of the lens assembly in the process of adjustment by the display unit. Accordingly, more accurate setting is obtainable to reduce measurement fluctuation.

Figure 19:
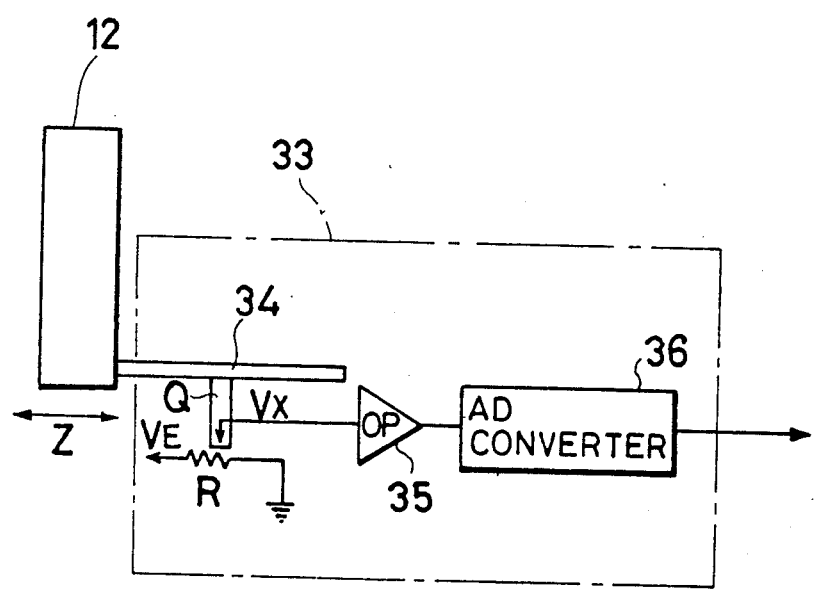
FIG. 19 is a diagram of a magnification sensor including a potentionmeter.

In this embodiment, a potentiometer can serve as an alternative for the differential transformer. FIG. 19 is a diagram of the magnification sensor employing a potentiometer. The magnification sensor 33 functions as follows: The lens assembly 12 has a sensor bar 34 which is designed to move along the movement of the lens members in the direction Z. The sensor bar 34 is fitted with a sliding contact Q against the potentiometer R. The potentiometer R is supplied with reference voltage Ve. Pickup voltage Vx appearing at the contact Q changes according to the movement of the lens members of the lens assembly 12. The output voltage Vx from the potentiometer is fed via an operational amplifier 35 to a AD converter 36 in which analog signals are converted into digital signals before being outputted into the processor/controller 7.

Figure 16:
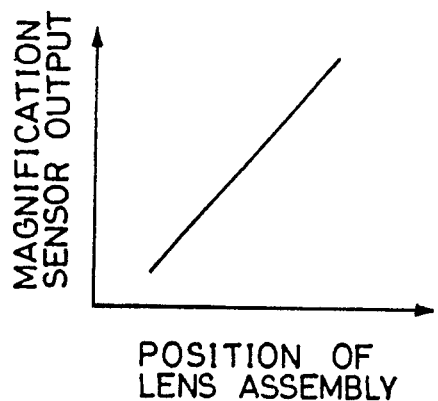
FIG. 16 is a graph showing a relationship between magnification sensor output and position of the lens assembly.
Figure 17:
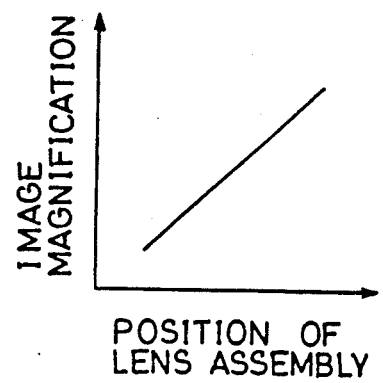
FIG. 17 is a graph showing a relationship between image magnification and position of the lens assembly.

The output signal from the magnification sensor is in proportion to the position of the lens members of the lens assembly 12 as shown in FIG. 16. Also, the magnification of the lens assembly is proportionally determined by the position of the lens members of the lens assembly as shown in FIG. 17. Consequently, the magnification value is proportional to the output from the magnification sensor 33. The magnification sensor using a potentiometer therefore functions in the same way as magnification sensor using a differential transformer. The flowchart of automatic magnification control, previously described referring to FIG. 18, also is applied to the magnification sensor using the potentiometer.

Figure 20:
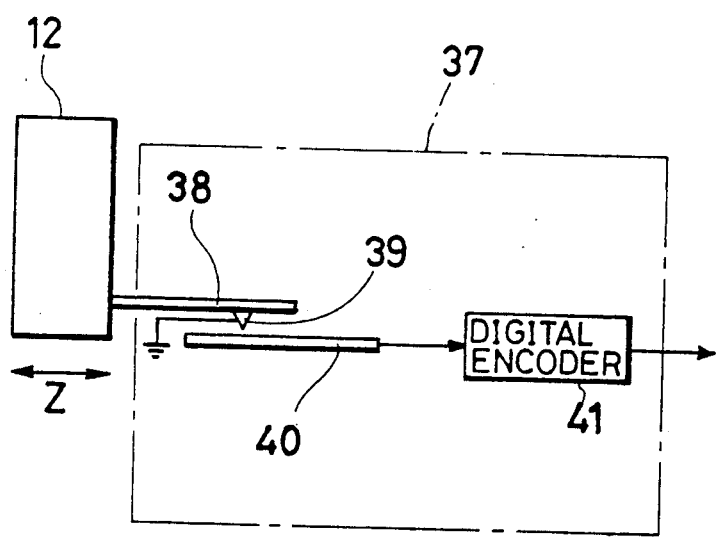
FIG. 20 is a diagram showing another magnification sensor including an encoder.
Figure 21:
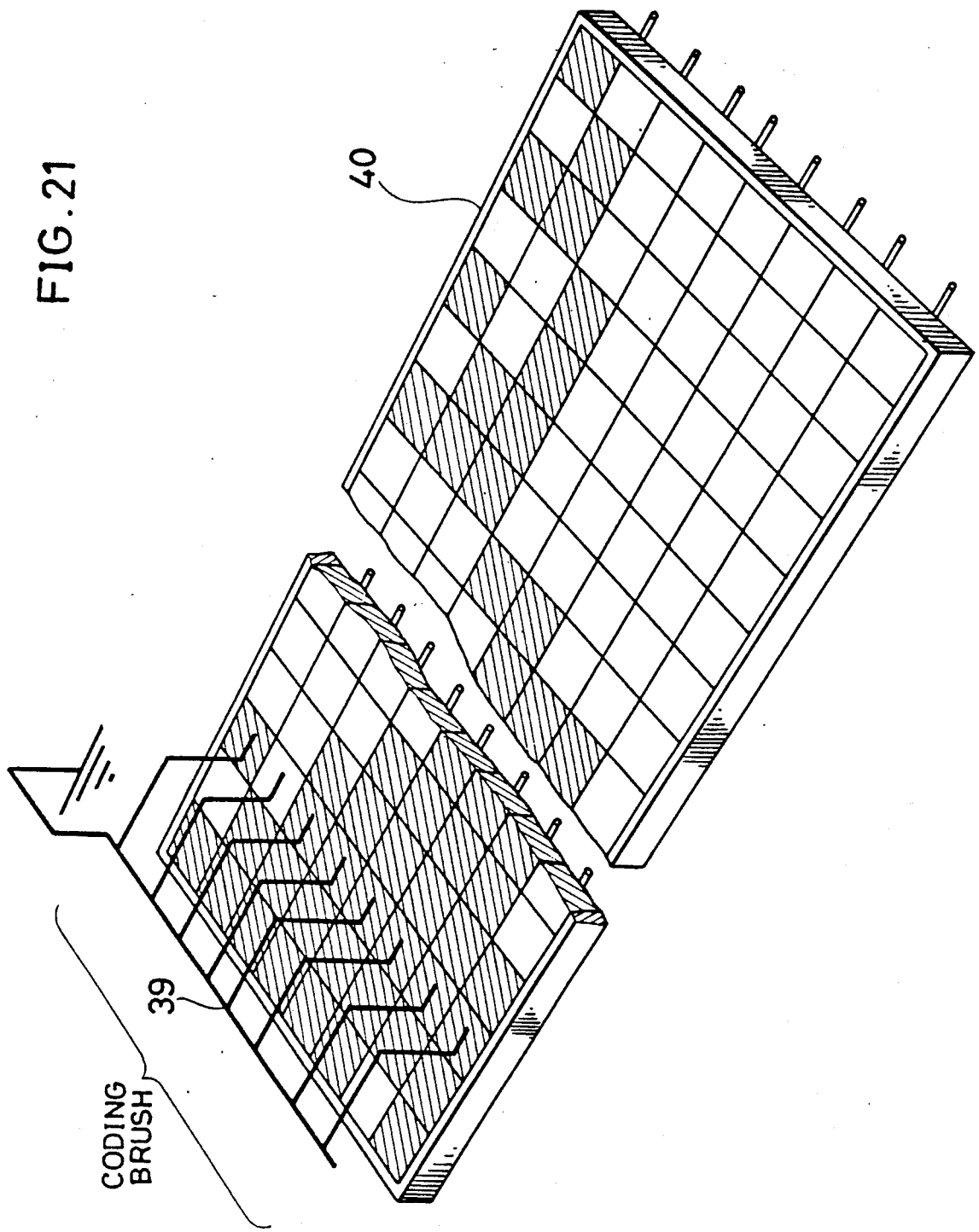
FIG. 21 is a perspective view showing a construction of the encoder.

As a second alternative for the differential transformer, an encoder serves in the second embodiment. FIG. 20 is a diagram showing a construction of a magnification sensor using an encoder. The magnification sensor 37 functions as follows: The lens assembly 12 has a sensor bar 38 which is designed to move along the movement of the lens members in the direction of Z. The sensor bar 38 is fitted with the eight grounded coding brushes 39 as shown in FIG. 21. Each tip of the eight coding brushes remains in contact with one of seven separately coded pattern traces (from line 0 through line 7 in FIG. 22) on a printed circuit board 40. Driven by the lens members in the lens assembly 12, the sensor bar 38 moves in the direction Z.

Figure 22:
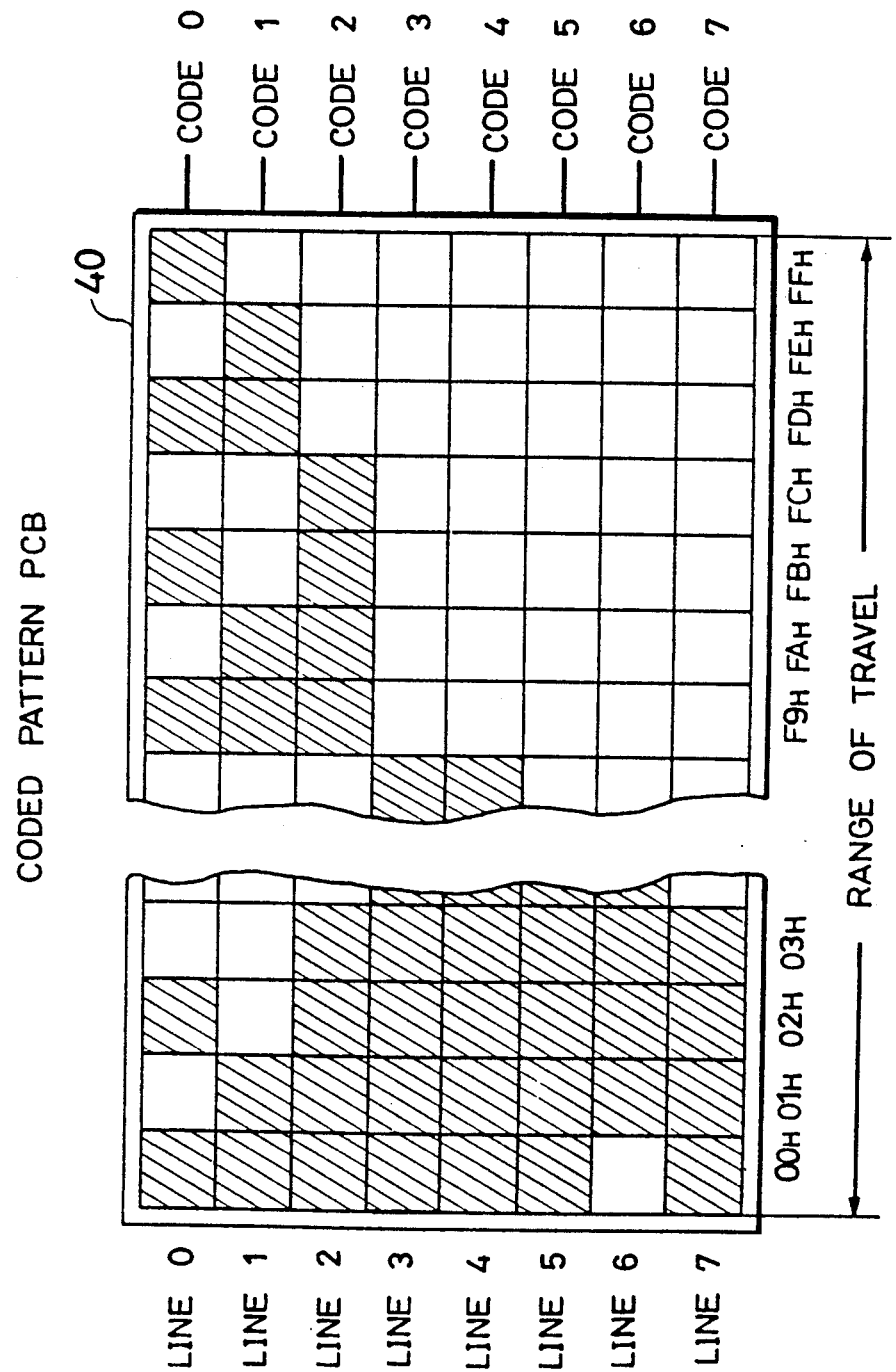
FIG. 22 is a plan view showing a coded pattern printed circuit board of the encoder.

The eight coding brushes 39 always stay in contact with their corresponding coded pattern traces on the printed circuit board 40 reading their present code which corresponds to the position of the lens members of the lens assembly 12. As shown in FIG. 22, the printed circuit board 40 has line 0 through line 7, each trace consisting of numerous small split areas, for example, 256 sections or $FF_H$ in hexadecimal number, over the effective area of travel within which the corresponding brushes 39 can move. Every split section is designed to be conductive or insulated to generate a coding signal. An insulated section is hatched as shown in FIG. 22. Each line of 0 through 7 has its own output line labeled code 0 through code 7 respectively. The eight output lines are linked to the digital encoder 41. Based on coded signals on code 0 through code 7, the digital encoder 41 generates an 8-bit coded signal corresponding to the position of the lens members of the lens assembly.

When the lens members of the lens assembly stops their motion for adjustment, the eight coding brushes 39 also stop somewhere on the coded pattern traces (from line 0 through line 7). All the coding brushes are grounded as previously mentioned, any lines of which coded sections are conductive make a short circuit to ground through corresponding brushes in contact with the lines. The other lines of which coded sections are insulated make an open circuit to ground (thus ungrounded). The digital encoder 41 generates an 8-bit coded signal (corresponding to the position of the lens members of the lens assembly) discriminating between the grounded and the ungrounded status at every coded pattern trace and then coding a logical 0 to the grounded circuit and a logical 1 to the ungrounded circuit. The magnification sensor therefore outputs digital positional signals in response to the position of the lens members of the lens assembly 12. The digital positional signals are proportional to the position of the lens members of the lens assembly, and furthermore the magnification value is also proportional to the position of the lens members of the lens assembly as shown in FIG. 17.

The magnification value is proportional to the output from the magnification sensor 37. This magnification sensor functions in the same way as previously described magnification sensors of a differential transformer or a potentiometer. The flowchart already described referring to FIG. 18 is also applied to this magnification sensor.

Figure 23:
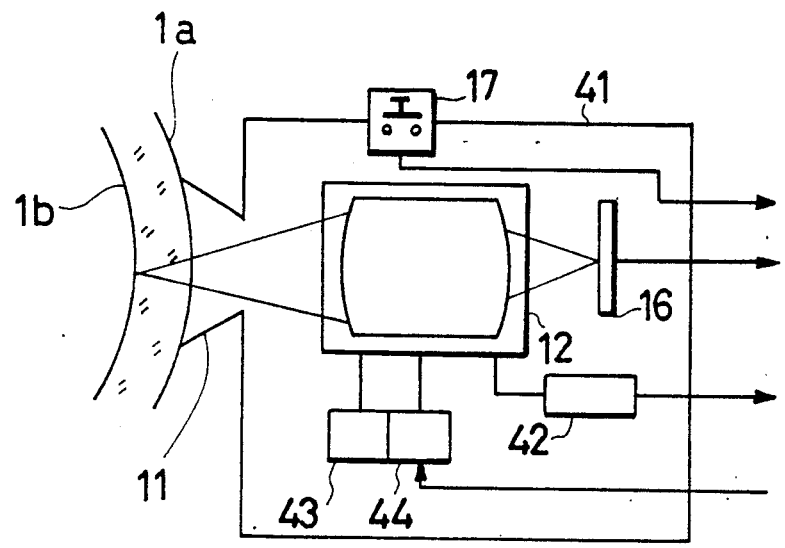
FIG. 23 is a diagram showing a construction of a color camera head of a third embodiment.

A third embodiment of the present invention will now be described. The third embodiment allows the lens assembly 12 to be automatically adjusted for proper position setting of its elements comparing a current magnification value of the lens assembly 12 to an optimum magnification setting. FIG. 23 shows the block diagram of a color camera head of the convergence measurement device in conjunction with the third embodiment. Denoted numerals are commonly employed in both FIG. 12 and FIG. 23 when members are identical. The magnification sensor 42, as previously mentioned in the second embodiment, can be one using a differential transformer, a potentiometer or an encoder. The lens assembly 12 comprises a zoom control, which permits lens members to move for focus adjustment and setting of magnification. The color camera head 41 includes a mechanism 43 for moving the lens member of the lens assembly 12 for focus adjustment and another mechanism 44 for moving the lens member for magnification setting. The focus control mechanism 43 is controlled by a control data provided by a focus sensing means. The magnification control mechanism 44 is controlled by a control signal from the processor/controller 7.

Figure 24:
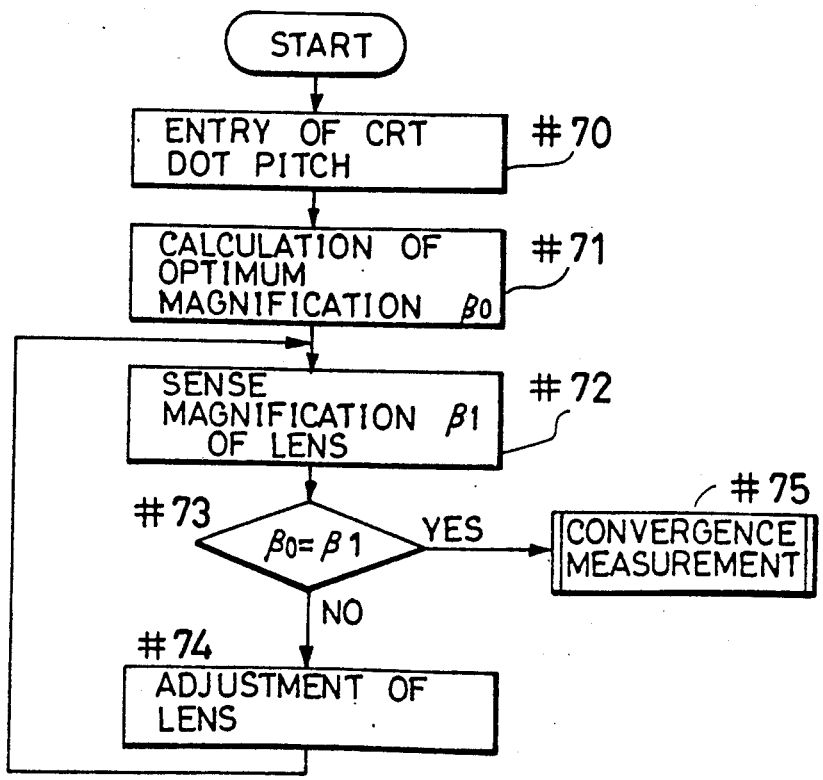
FIG. 24 is a flowchart showing a magnification setting process of the third embodiment.

A convergence measurement process in the third embodiment will be described referring to FIG. 24.

A phosphor dot pitch Pt of the color CRT under test is first input through the data input circuit 10 by the operator (Step #70). Upon receiving the phosphor dot pitch, the processor/controller 7 will retrieve and execute a magnification determining program stored in the memory 8 to give an optimum magnification $\beta 0$ suitable to convergence measurement (Step #71). Optimum magnification $\beta 0$, for example, is determined according to the following relationship:

$$\beta o = 20 \cdot Pt'/(\sqrt{3} Pt),$$

as already mentioned in the first embodiment.

In Step #72, the processor/controller 7 commands a magnification sensing means 42 to sense a magnification value $\beta 1$ at a current position of the lens members of the lens assembly 12 and read in resulting magnification value $\beta 1$. Current magnification value $\beta 1$ is compared to $\beta 0$ (optimum mangnification) in Step #73. If $\beta 0$ is not equal to $\beta 1$, it transmits a movement command to the magnification control mechanism 44 for it to move the lens members of the lens assembly 12 in Step #74. The process returns to Step #72. If $\beta 0$ is equal to $\beta 1$ in Step #73, the process advances to Step #75 in which convergence measurement is carried out.

Figure 25:
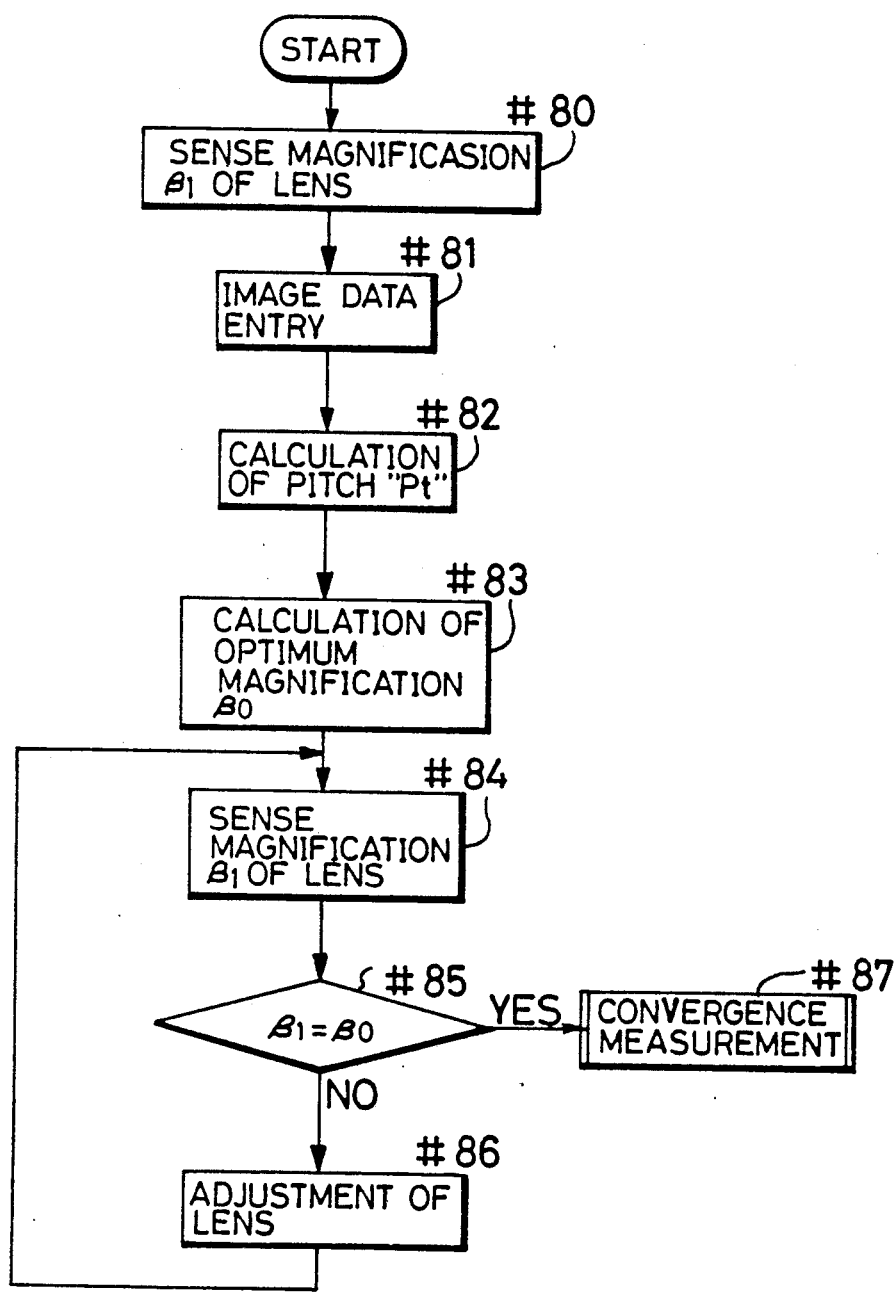
FIG. 25 is a flowchart showing another magnification setting process of the third embodiment.

Another measurement process applicable in this embodiment will now be described with reference to FIG. 25. In the previous process, a phosphor dot pitch of the color CRT is manually entered via the data input circuit 10 to the processor/controller 7 to determine the optimum magnification and then to automatically adjust the lens assembly 12 for the optimum magnification. In the process of FIG. 25, a phosphor dot pitch of the color CRT is firstly calculated from stored image signals and an optimum phosphor dot pitch is calculated for the calculated phosphor dot pitch. Subsequently, the lens assembly 12 is set at the optimum magnification by automatically checking whether a current magnification of the adjusting lens assembly agrees with the optimum magnification.

The color camera head 41 is placed on the viewing screen of the color CRT 1a under test so as to pick up a test pattern presented on the viewing screen. The color camera head 41 is set at an arbitrary magnification $\beta 1$. The magnification sensing means 42 senses the arbitrary magnification $\beta 1$ in Step #80. The picked-up image data is stored in the video memory 6 in Step #81. In Step #82, the processor/controller 7 calculates a pitch of phosphor dot images which are magnified by the lens assembly 12 from the stored image data using Fourier transformation, etc., and calculates an actual pitch Pt of the phosphor dots on the viewing screen from the magnification $\beta 1$ of the lens assembly 12 and the phosphor dot image pitch. Subsequently, the processor/controller 7 calculates an optimum magnification $\beta 0$ suitable for the actual phosphor dot pitch Pt in Step #83. A current magnification $\beta 1$ of the lens assembly 12 is sensed by the magnification sensing means 42 in Step #84. The current magnification $\beta 1$ is compared to the optimum magnification $\beta 0$ in Step #85. If the current magnification $\beta 1$ and the optimum magnification $\beta 0$ do not agree with each other, the lens members of the lens assembly 12 is moved by a predetermined amount by the magnification control mechanism 44 in accordance with a control signal in Step #86, and the process returns to Step #84. If the current magnification $\beta 1$ and the optimum magnification $\beta 0$ agree with each other, measurement of convergence is carried out in Step #87. The optimum magnification β0 is used to change from a misconvergence calculated from the picked-up image data to an actual dimension of the color CRT.

This process eliminates manual setting of the magnification of the lens assembly 12, and manual inputting of optimum magnification data. Consequently, this process provides easier measurement operation and reduced measurement error.

Figure 26:
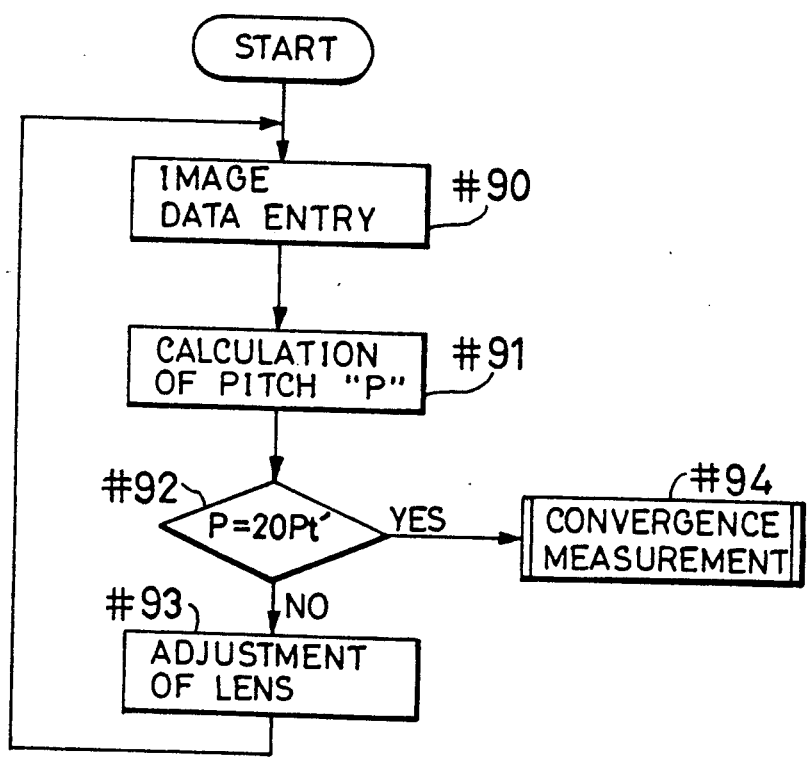
FIG. 26 is a flowchart showing yet another magnification setting process of the third embodiment.
Figure 27:
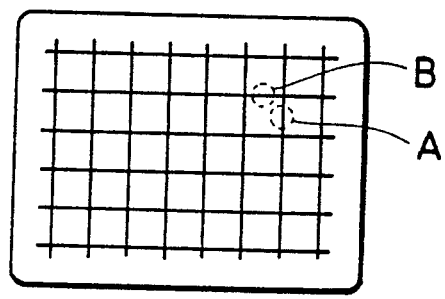
FIG. 27 is a diagram showing a cross hatch test pattern.
Figure 28:
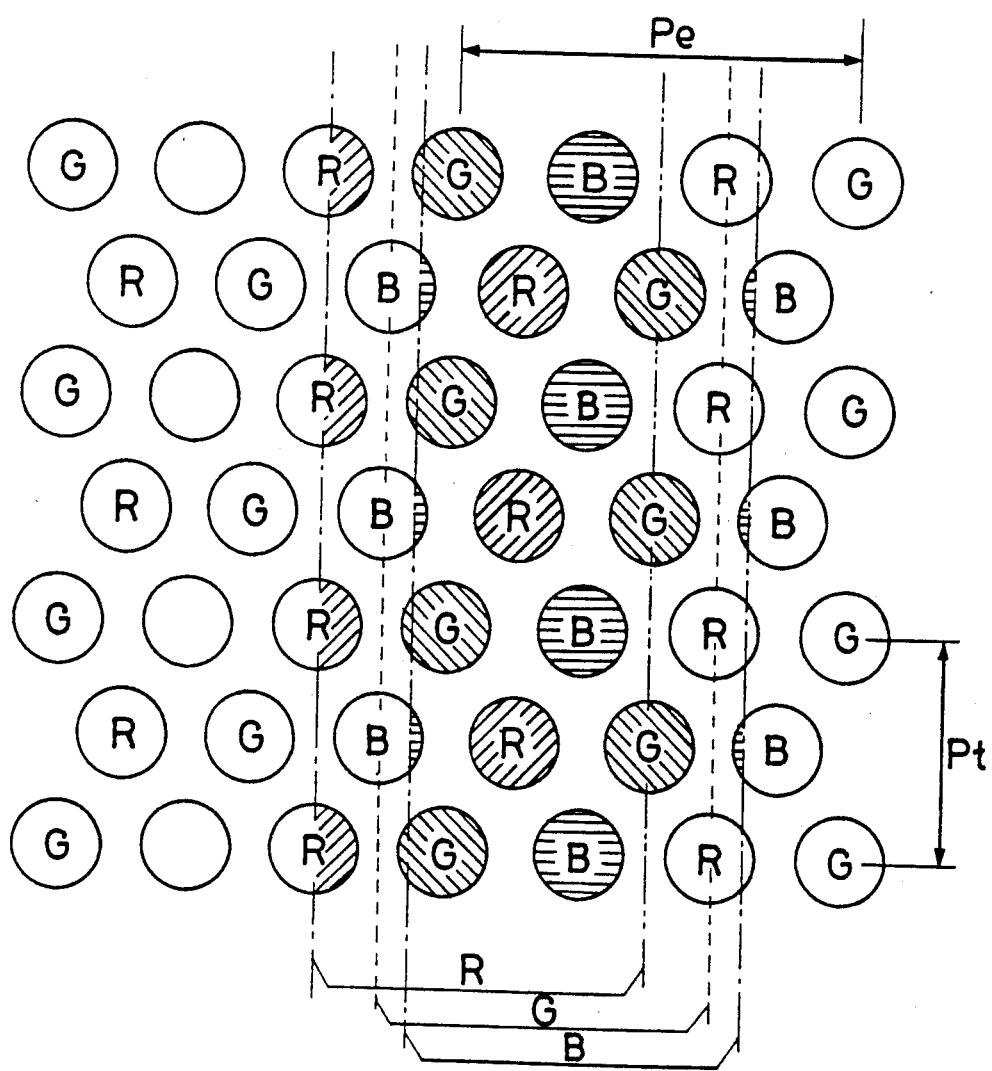
FIG. 28 is an expanded diagram showing an area A shown in FIG. 27.

Furthermore, yet another measurement process applicable in this embodiment will be described with reference to FIG. 26. In the previous two processes, the magnification of the lens assembly 12 is automatically adjusted by comparing a current magnification to an optimum magnification. In the process of FIG. 26, the lens assembly 12 is automatically adjusted by comparing a pitch of phosphor dot images which are magnified by the lens assembly 12 to a reference value equal to the product of a pixel pitch Pt' of the image pickup device 16 and a specified integer.

The color camera head 41 is placed on the viewing screen of the color CRT under test to pick up a test pattern presented on the viewing screen. The color camera head 41 is set at an arbitrary magnification. The picked-up image data is stored in the video memory 6 in Step #90. In Step #91, the processor/controller 7 calculates a pitch P of phosphor dot images which are magnified by the lens assembly 12 from the stored image data using Fourier transformation, etc. Then, the processor/controller 7 compares the pitch P to a reference value in Step #92. The reference value is equal to the product of a pixel pitch Pt' of the image pickup device 16 and an integer of 20, or 20Pt', and is previously entered in the processor/controller 7. If the pitch P is not equal to 20Pt' in Step #92, the lens members of the lens assembly 12 is moved by a predetermined amount by the magnification control mechanism 44 in accordance with a control signal in Step #93, and the process returns to Step #90. If the pitch P is equal to 20Pt' in Step #92, measurement of convergence is carried out in Step #94. The magnification of the lens assembly 12 at the time of P=20Pt', which is detected by the magnification sensing means 42, is used to change from a misconvergence calculated from the pick-up image data to an actual dimension of the color CRT. It should be noted that the factor number to be multiplied by the pixel pitch Pt' is not limited to 20 and other integers are applicable.

This process eliminates manual setting of the magnification of the lens assembly 12, and manual inputting of optimum magnification data. Consequently, this process provides easier measurement operation and reduced measurement error.

Furthermore, it would be understood that the foregoing relates to only the scope of the present invention as defined by the appended claims rather than by the description preceding them, and all changes that fall within metes and bounds of the claims, or equivalence of such metes and bounds are therefore intended to be embraced by the claims.

What is claimed is:

1. A device for measuring convergence of a color CRT comprising:
   image pickup means for producing three color image signals with respect to three color test patterns constituting a composite test pattern presented on a viewing screen of a color CRT;
   determining means for determining the image magnification of said image pickup means according to the pitch between color phosphor elements on the viewing screen, and
   calculation means for calculating respective luminous centers of gravity of the three color test patterns from the three color image signals, and calculating a misconvergence of the color CRT from the calculated luminous centers of gravity and a changed image magnification,
   wherein the composite test pattern is a crosshatch pattern, said calculation means calculates respective vertical luminous centers of gravity of the three color test patterns on a horizontal line portion of the cross-hatch pattern to calculate a vertical misconvergence of the color CRT, and calculates respective horizontal luminous centers of gravity of the three color test patterns on a vertical line portion of the cross-hatch pattern to calculate a horizontal misconvergence of the color CRT.

2. A device for measuring convergence of a color CRT comprising:
   image pickup means for producing three color image signals with respect to three color test patterns constituting a composite test pattern presented on a viewing screen of a color CRT;
   determining means for determining the image magnification of said image pickup means according to the pitch between color phosphor elements on the viewing screen, including:
   a lens assembly having a magnification changing lens;
   drive means for driving said magnification changing lens, and
   means for actuating said drive means so as to obtain a desirable image magnification, and
   calculating means for calculating respective luminous centers of gravity of the three color test patterns from the three color image signals, and calculating a misconvergence of the color CRT from the calculated luminous centers of gravity and a changed image magnification.

3. A device according to claim 2 wherein said means for actuating including a scale having marks representing a number of phosphor element pitches, the marks corresponding to respective image magnifications suitable for the number of phosphor element pitches, whereby the image magnification suitable for a phosphor element pitch of the CRT is obtainable by actuating said means for actuating so that the mark representing the phosphor element pitch reaches a predetermined position.

4. A device according to claim 2 further comprising:
   detection means for detecting the image magnification of said lens assembly;
   pitch calculation means for calculating a phosphor element pitch suitable for a detected image magnification; and
   display means for displaying the calculated phosphor element pitch
   whereby said actuatable means for actuating is so that the calculated phosphor element pitch displayed on said display means agrees with the phosphor element pitch of the CRT.

5. A device for measuring convergence of a color CRT comprising:
   image pickup means for producing three color image signals with respect to three color test patterns constituting a composite test pattern presented on a viewing screen of a color CRT;

determining means for determining the image magnification of said image pickup means according to the pitch between color phosphor elements on the viewing screen, including:

a lens assembly having a magnification changing lens;

magnification change means for changing the image magnification of said lens assembly;

input means for inputting the phosphor element pitch of the CRT;

magnification calculation means for calculating an image magnification suitable for the input phosphor element pitch, and control means for controlling said magnification change means so that the image magnification of said lens assembly agrees with the calculated image magnification, and calculation means for calculating respective luminous centers of gravity of the three color test patterns from the three color image signals, and calculating a misconvergence of the color CRT from the calculated luminous centers of gravity and a changed image magnification.

6. A device for measuring convergence of a color CRT comprising:

image pickup means for producing three color image signals with respect to three color test patterns constituting a composite test pattern presented on a viewing screen of a color CRT;

change means for changing the image magnification of said image pickup means according to the pitch between color phosphor elements on the viewing screen, including:

a lens assembly having a magnification changing lens;

magnification change means for changing the image magnification of said lens assembly;

pitch detection means for detecting the phosphor element pitch of the CRT;

magnification calculation means for calculating an image magnification corresponding to the detected phosphor element pitch, and control means for controlling said magnification change means so that the image magnification of said lens assembly agrees with the calculated image magnification, and calculation means for calculating respective luminous centers of gravity of the three color test patterns from the three color image signals, and calculating a misconvergence of the color CRT from the calculated luminous centers of gravity and a changed image magnification.

7. A device for measuring convergence of a color CRT comprising:

image pickup means for producing three color image signals with respect to three color test patterns constituting a composite test pattern presented on a viewing screen of a color CRT;

change means for changing the image magnification of said image pickup means according to the pitch between color phosphor elements on the viewing screen, including:

a lens assembly having a magnification changing lens;

magnification change means for changing the image magnification of said lens assembly;

pitch detection means for detecting a pitch of phosphor element images;

storage means for storing a specified pitch, and control means for controlling said magnification change means so that the detected pitch of phosphor element images agrees with the stored specified pitch, and calculation means for calculating respective luminous centers of gravity of the three color test patterns from the three color image signals, and calculating a misconvergence of the color CRT from the calculated luminous centers of gravity and a changed image magnification.

8. A device for measuring a characteristic of a color CRT comprising:

image pickup means, having color pixels, for producing three color images with respect to three color test patterns presented as a composite test pattern on a viewing screen of the color CRT;

means for determining the image magnification of the composite test pattern on the color pixels according to a pitch between color phosphor elements on the viewing screen and a pitch of the color pixels, and means for calculating the characteristic value according to the output of the producing means.

9. A device according to claim 8 further including change means for changing the image magnification so that the pitch between color phosphor elements projected on the image pickup means becomes a product of an integer number and the pitch between color pixels, and images of the color pixels under the projected phosphor elements become congruent.

10. A device as claimed in claim 8 wherein the calculating means includes means, according to the three color images obtained by the focused composite test pattern with the determined image magnification, for calculating a convergence value representing convergence of each electrical beam from cathode ray tubes against each color phosphor in the CRT.

11. A device for measuring convergence of a color CRT comprising:

means, having color pixels, for producing three color images with respect to three color test patterns constituting a composite test pattern presented on a viewing screen of a color CRT;

means for determining the image magnification of the composite test pattern on the color pixels according to the pitch between color phosphor elements on the viewing screen;

means for focusing the image of the composite test pattern on the color pixels, and means for calculating a convergence value according to the three color images obtained by the focused composite test pattern with the determined image magnification.

12. A device for measuring a characteristic of a color CRT which generates a composite test pattern including three color test patterns on a viewing screen comprising:

means, having color pixels, for producing three color images with respect to the three color test patterns;

means for determining the image magnification of the composite test pattern on the color pixels according to the pitch between color phosphor elements on the viewing screen;

means for focusing the image of the composite test pattern on the color pixels, and means for calculating a characteristic value according to the three color images under the in-focus condition by the focusing means.

13. A device as claimed in claim 12 wherein the calculating means includes means, according to the three color images, for calculating a convergence value representing convergence of each electrical beam from cathode ray tubes against each color phosphor in the CRT.

* * * * *